(12) United States Patent
Mi et al.

(10) Patent No.: US 10,351,963 B2
(45) Date of Patent: Jul. 16, 2019

(54) PHOTOCATHODES AND DUAL PHOTOELECTRODES FOR NANOWIRE PHOTONIC DEVICES

(71) Applicant: THE ROYAL INSTITUTION FOR THE ADVANCEMENT OF LEARNING/MCGILL UNIVERSITY, Montreal (CA)

(72) Inventors: Zetian Mi, Verdun (CA); Shizhao Fan, Montreal (CA); Bandar Alotaibi, Montreal (CA)

(73) Assignee: THE ROYAL INSTITUTION FOR THE ADVANCEMENT OF LEARNING/ MCGILL UNIVERSITY, Montreal (CA)

( * ) Notice: Subject to any disclaimer, the term of this patent is extended or adjusted under 35 U.S.C. 154(b) by 439 days.

(21) Appl. No.: 15/071,268

(22) Filed: Mar. 16, 2016

(65) Prior Publication Data

US 2016/0273115 A1 Sep. 22, 2016

Related U.S. Application Data

(60) Provisional application No. 62/133,588, filed on Mar. 16, 2015.

(51) Int. Cl.
| | | |
|---|---|---|
| *C25B 1/00* | (2006.01) | |
| *C25B 9/00* | (2006.01) | |
| *C01B 3/04* | (2006.01) | |

(52) U.S. Cl.
CPC ............... *C25B 9/00* (2013.01); *C01B 3/042* (2013.01); *C25B 1/003* (2013.01); *Y02E 60/364* (2013.01); *Y02E 60/368* (2013.01)

(58) Field of Classification Search
CPC ........... C25B 1/003; C25B 9/00; C01B 3/042; Y02E 60/364; Y02E 60/368
See application file for complete search history.

(56) References Cited

U.S. PATENT DOCUMENTS 8,563,395 B2 10/2013 Mi
8,669,544 B2 3/2014 Mi et al.
(Continued)

FOREIGN PATENT DOCUMENTS

WO 2016015134 A1 2/2016

OTHER PUBLICATIONS

Prevot et al, "Photoelectrochemical Tandem Cells for Solar Water Splitting", The Journal of Physical Chemistry C, Jul. 2013, vol. 117, No. 35, pp. 17879-17893, American Chemical Society.
(Continued)

*Primary Examiner* — Ciel P Thomas
(74) *Attorney, Agent, or Firm* — Norton Rose Fulbright Canada LLP; Reno Lessard

(57) ABSTRACT

Important components of direct solar based nanowire enabled chemical processing and electrochemical systems are a high efficiency and highly stable photocathode and 2-photon dual electrodes. The former enables photo-excited electrons that lead to hydrogen generation whereas the later with complementary energy bandgap photoanode and photocathode enables high efficiency, unassisted solar-driven water splitting. Accordingly, it would be beneficial to leverage the high surface areas and self-contained conversion of direct solar illuminated hydrogen generation from such nanowires with multiple junctions for broad solar spectrum absorption by providing monolithically integrated multijunction photocathodes. It would be further beneficial to provide nanowire based dual-photoelectrode systems that together with a parallel illumination scheme, can fundamentally address these critical challenges. It would be further beneficial for these nanowire based dual-photoelectrode systems to exploit a semiconductor material family that can be tuned across the solar spectrum, can be doped both p-type and n-type and supported large current conduction.

6 Claims, 13 Drawing Sheets

(56) References Cited

U.S. PATENT DOCUMENTS

| | | | |
|---|---|---|---|
| 2002/0063256 A1* | 5/2002 | Lin | H01L 33/387 257/79 |
| 2003/0157741 A1* | 8/2003 | Oohata | H01L 25/0753 438/34 |
| 2004/0012030 A1* | 1/2004 | Chen | H01L 33/38 257/99 |
| 2013/0240348 A1 | 9/2013 | Mi et al. | |

OTHER PUBLICATIONS

Kudo et al., "Heterogeneous Photocatalyst Materials for Water Splitting", Chemical Society Reviews, Jan. 2009, vol. 38, No. 1, pp. 253-278, Royal Society of Chemistry.

Kitano et al., "Heterogeneous Photocatalytic Cleavage of Water", Journal of Materials Chemistry, Jan. 2010, vol. 20, No. 4, pp. 627-641, Royal Society of Chemistry.

Gao et al., "Photoelectrochemical Hydrogen Production on InP Nanowire Arrays with Molybdenum Sulfide Electrocatalysts", ACS Nano Letters, May 2014, vol. 14, No. 7, pp. 3715-3719, American Chemical Society.

Kato et al., "Epitaxial p-type SiC as a Self-Driven Photocathode for Water Splitting", International Journal of Hydrogen Energy, Mar. 2014, vol. 39, No. 10, pp. 4845-4849, Elsevier.

Ding et al, "Efficient Photoelectrochemical Hydrogen Generation Using Heterostructures of Si and Chemically Exfoliated Metallic MoS2", Journal of the American Chemical Society, May 2014, vol. 136, No. 24, pp. 8504-8507, American Chemical Society.

Esposito et al., "A. H2 Evolution at Si-based Metal-Insulator-Semiconductor Photoelectrodes Enhanced by Inversion Channel Charge Collection and H Spillover", Nature Materials, May 2013, vol. 12, pp. 562-568, Nature Publishing Group.

Oh et al. "Enhanced Photoelectrochemical Hydrogen Production from Silicon Nanowire Array Photocathode", ACS Nano Letters, Dec. 2011, vol. 12, No. 12, pp. 298-302, American Chemical Society.

Li et al., "Photo-Induced Conversion of Methane into Benzene over GaN Nanowires", Journal of the American Chemical Society, May 2014, vol. 136, No. 22, pp. 7793-7796, American Chemical Society.

Simpkins et al., "Surface Depletion Effects in Semiconducting Nanowires", Journal of Applied Physics, May 2008, vol. 103, 104313, American Institute of Physics.

Chang et al., "Molecular Beam Epitaxial Growth and Characterization of Non-Tapered InN Nanowires on Si (111)", IOP Nanotechnology, Aug. 2009, vol. 20, No. 34, 345203, Institute of Physics.

Hu et al., "Amorphous TiO2 Coatings Stabilize Si, GaAs, and GaP Photoanodes for Efficient Water Oxidation", AAAS Science, May 2014, vol. 344, No. 6187, pp. 1005-1009, American Association for the Advancement of Science.

Kenney et al., "High-Performance Silicon Photoanodes Passivated with Ultrathin Nickel Films for Water Oxidation", AAAS Science, Nov. 2013, vol. 342, No. 6160, pp. 836-840, American Association for the Advancement of Science.

Chen et al, "Accelerating Materials Development for Photoelectrochemical Hydrogen Production: Standards for Methods Definitions, and Reporting Protocols", Journal of Materials Research, Jan. 2010, vol. 25, No. 1, pp. 3-16, Cambridge University Press.

Wu et al., "GaN (0001)-(1× 1) surfaces: Composition and electronic properties", Journal of Applied Physics, Apr. 1998, vol. 83, No. 8, pp. 4249-4252, American Institute of Physics.

Guha et al., "Ultraviolet and Violet GaN Light Emitting Diodes on Silicon", Applied Physics Letters, Jan. 2008, vol. 72, 415, American Institute of Physics.

Branz et al., "Nanostructured Black Silicon and the Optical Reflectance of Graded-Density Surfaces", Applied Physics Letters, Jun. 2009, vol. 94, 231121, American Institute of Physics.

Xie et al., "Realization of effective light trapping and omnidirectional antireflection in smooth surface silicon nanowire arrays", IOP Nanotechnology, Jan. 2011, vol. 22, No. 6, 065704, Institute of Physics.

Iyengar et al., "Optical Properties of Silicon Light Trapping Structures for Photovoltaics", Solar Energy Materials and Solar Cells, Dec. 2010, vol. 94, No. 12, pp. 225102257, Elsevier Publishing.

Wen et al., "Theoretical Analysis and Modeling of Light Trapping in High Efficiency GaAs Nanowire Array Solar Cells", Applied Physics Letters, Oct. 2011, vol. 99, 143116, American Institute of Physics.

Bolts et al., "A Double Photoelectrode-based Cell for the Conversion of Light to Electricity: p-type Cadmium Telluride and n-type Cadmium Selenide Pphotoelectrodes in a Polysulfide Electrolyte", Journal American Chemical Society, Jun. 1977, vol. 99, No. 14, pp. 4826-4827, American Chemical Society.

Latempa et al., "Generation of Fuel from CO2 Saturated Liquids using a p-Si Nanowire II n-TiO2 Nanotube Array Photoelectrochemical Cell", Nanoscale, Feb. 2012, vol. 4, pp. 2245-2250, Royal Society of Chemistry.

Coridan et al., "Electrical and Photoelectrochemical Properties of WO3/Si Tandem Photoelectrodes" Journal of Physical Chemistry C, Mar. 2013, vol. 117, No. 14, pp. 6949-6957, American Chemical Society.

Nozik et al., "Photochemical Diodes", Applied Physics Letters, Aug. 2008, vol. 30, pp. 567-569, American Institute of Physics.

Yoneyama et al., "A Photo-Electochemical Cell with Production of Hydrogen and Oxygen by a Cell Reaction", Electrochimica Acta, May 1975, vol. 20, No. 5, pp. 341-345, Elsevier Publishing.

Rai et al., "Morphological, optical and photoelectrochemical properties of Fe2O3-GNP composite thin films", RSC Advances, Apr. 2014, vol. 4, pp. 17671-17679, Royal Society of Chemistry.

Hanna et al., "Solar Conversion Efficiency of Photovoltaic and Photoelectrolysis Cells with Carrier Multiplication Absorbers", Journal of Applied Physics, Oct. 2006, vol. 100, 074510, American Institute of Physics.

Khaselev et al., "High-Efficiency Integrated Multijunction Photovoltaic/ Electrolysis Systems for Hydrogen Production", International Journal of Hydrogen Energy, Feb. 2001, vol. 26, No. 2, pp. 127-132, Elsevier Publishing.

Yoon et al., "Photoelectrochemical Conversion in a WO {sub 3} Coated p-Si Photoelectrode: Effect of Annealing Temperature", Journal of Applied Physics, May 1997, vol. 81, No. 10, pp. 7024-7029, American Institute of Physics.

Yoon et al., "Effect of Pt Layers on the Photoelectrochemical Properties of a WO3/p-SiWO3/p-Si Electrode", Journal of Applied Physics, Oct. 1998, vol. 84, No. 7, pp. 3954-3959, American Institute of Physics.

Moses et al., "Band Bowing and Band Alignment in InGaN Alloys", Applied Physics Letters, Jan. 2010, vol. 96, 021908, American Institute of Physics.

Fujii et al., "Photoelectrochemical Properties of p-Type GaN in Comparison with n-Type GaN", Japanese Journal of Applied Physics, Jul. 2005, vol. 44, Part 2, Nos. 28-32, pp. L909-L911, Japan Society of Applied Physics.

Fujii et al., "Photoelectrochemical Properties of InxGa1-xN/GaN Multiquantum Well Structures in Depletion Layers", ACS Journal of Physical Chemistry C, Nov. 2011, vol. 115, No. 50, pp. 25165-25169, Americal Chemical Society.

Brown et al., "Limiting efficiency for current-constrained two-terminal tandem cell stacks", Progress in Photovoltaics, Jan. 2002, vol. 10, No. 5, pp. 299-307, J. Wiley & Sons.

White et al., "Semiconductor Electrodes LVI. Principles of Multijunction Electrodes and Photoelectrosynthesis at Texas Instruments' p/n-Si Solar Arrays", Journal of the Electrochemical Society, 1985, vol. 132, No. 3, pp. 544-550, The Electrochemical Society.

Johnson et al., "Recent Progress in a Residential Solar Energy System Development", Proc. 4th E.C. Photovoltaic Solar Energy Conference, May 1982, Session 6, pp. 611-615, Springer Netherlands.

Pan et al., "Synthesis of Three-Dimensional Hyperbranched TiOsub2 Nanowire Arrays with Significantly Enhanced Photoelectrochemical Hydrogen Production", RSC Journal of Materials Chemistry A, Jan. 2015, vol. 3, No. 7, pp. 4004-4009, Royal Society of Chemistry.

Gurudayal et al., "Core—Shell Hematite Nanorods: A Simple Method to Improve the Charge Transfer in the Photoanode for

(56) References Cited

OTHER PUBLICATIONS

Photoelectrochemical Water Splitting", ACS Applied Material Interfaces, Mar. 2015, vol. 7, No. 12, pp. 6852-6859, American Chemical Society.
Ren et al., "A Three-Dimensional Hierarchical TiO(sub)2 Urchin as a Photoelectrochemical Anode with Omnidirectional Anti-Reflectance Properties", RSC Physical Chemistry Chemical Physics, Sep. 2014, vol. 16, No. 42, pp. 22953-22957, Royal Society of Chemistry.
Nakabayashi et al., "Fabrication of CuBi2O4 photocathode through novel anodic electrodeposition for solar hydrogen production", Electrochemica Acta, vol. 125, pp. 191-198, Elsevier Publishing.
Hu et al., "Fe(III) Doped and Grafted PbTiO3 Film Photocathode with Enhanced Photoactivity for Hydrogen Production", Applied Physics Letters, Aug. 2014, vol. 105, 082903, American Institute of Physics.
Guan et al., "Formation Mechanism of ZnS Impurities and their Effect on Photoelectrochemical Properties on a Cu2ZnSnS4 Photocathode", RSC Crystengcomm, Jan. 2014, vol. 16, No. 14, pp. 2929-2936, Royal Society of Chemistry.

\* cited by examiner

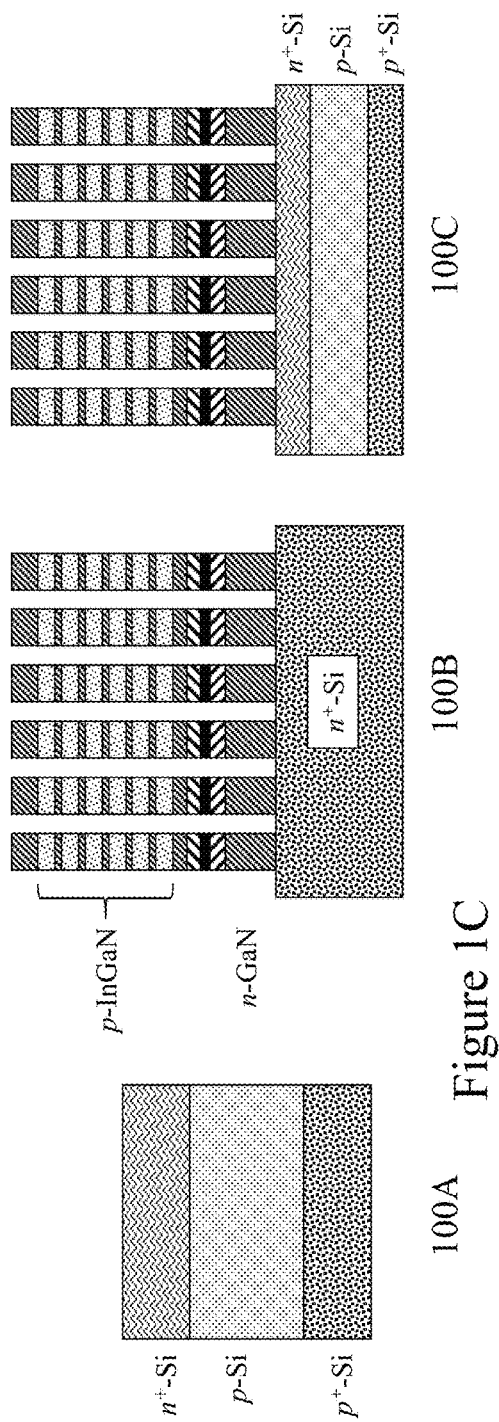
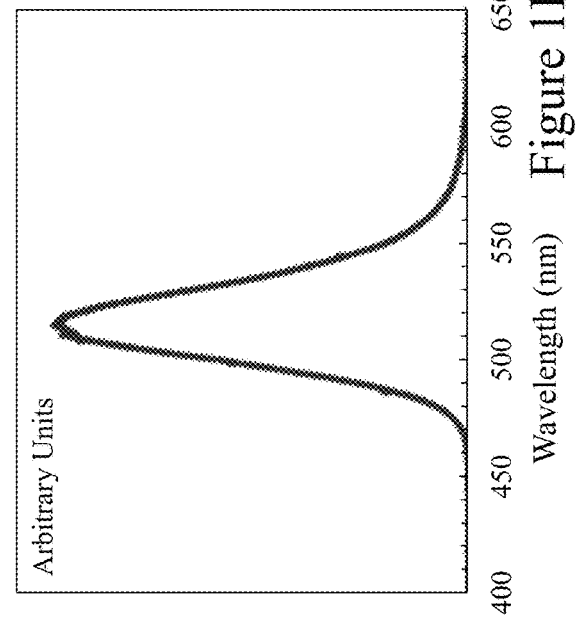
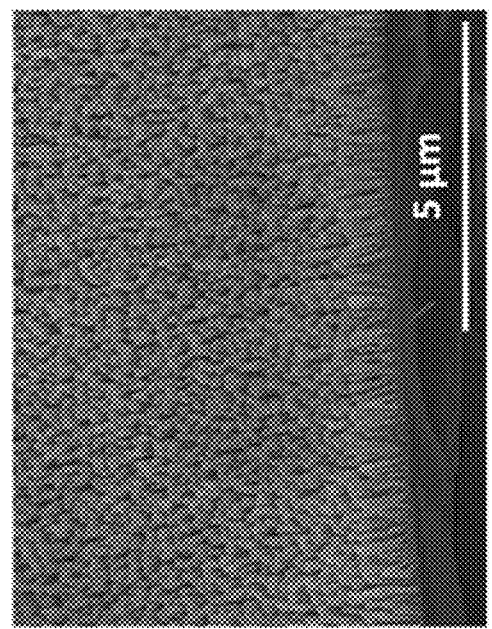
Figure 1C
Figure 1E
Figure 1D

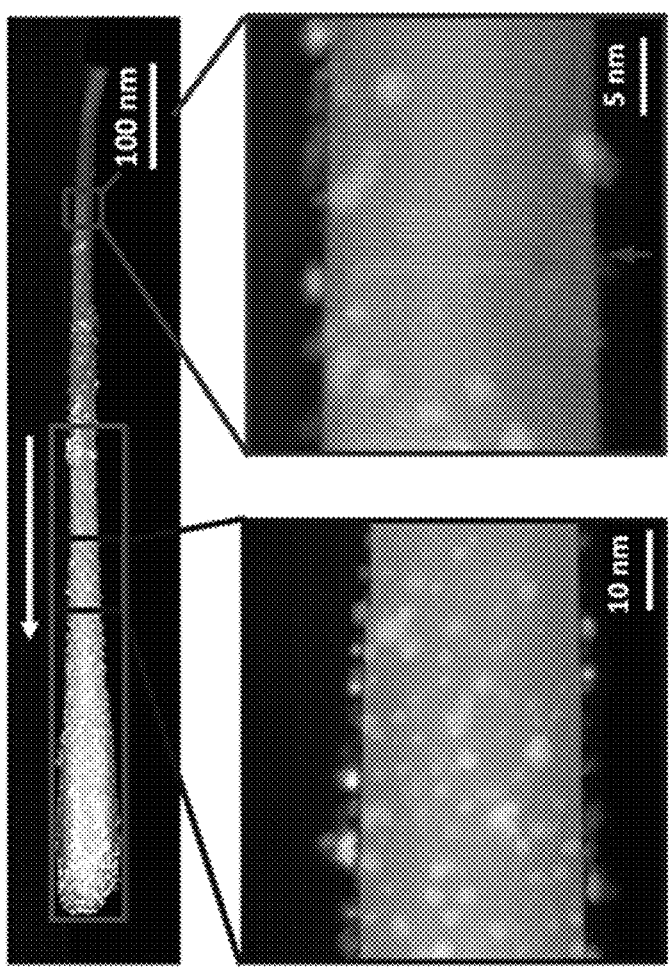
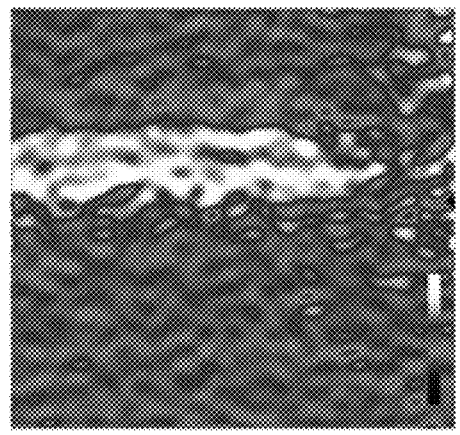
Figure 2A
Figure 2B
Figure 2C
Figure 2D
Figure 2E
Figure 2F

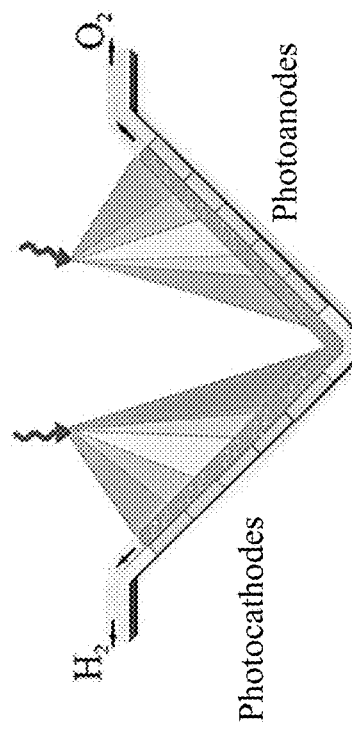
Figure 5A
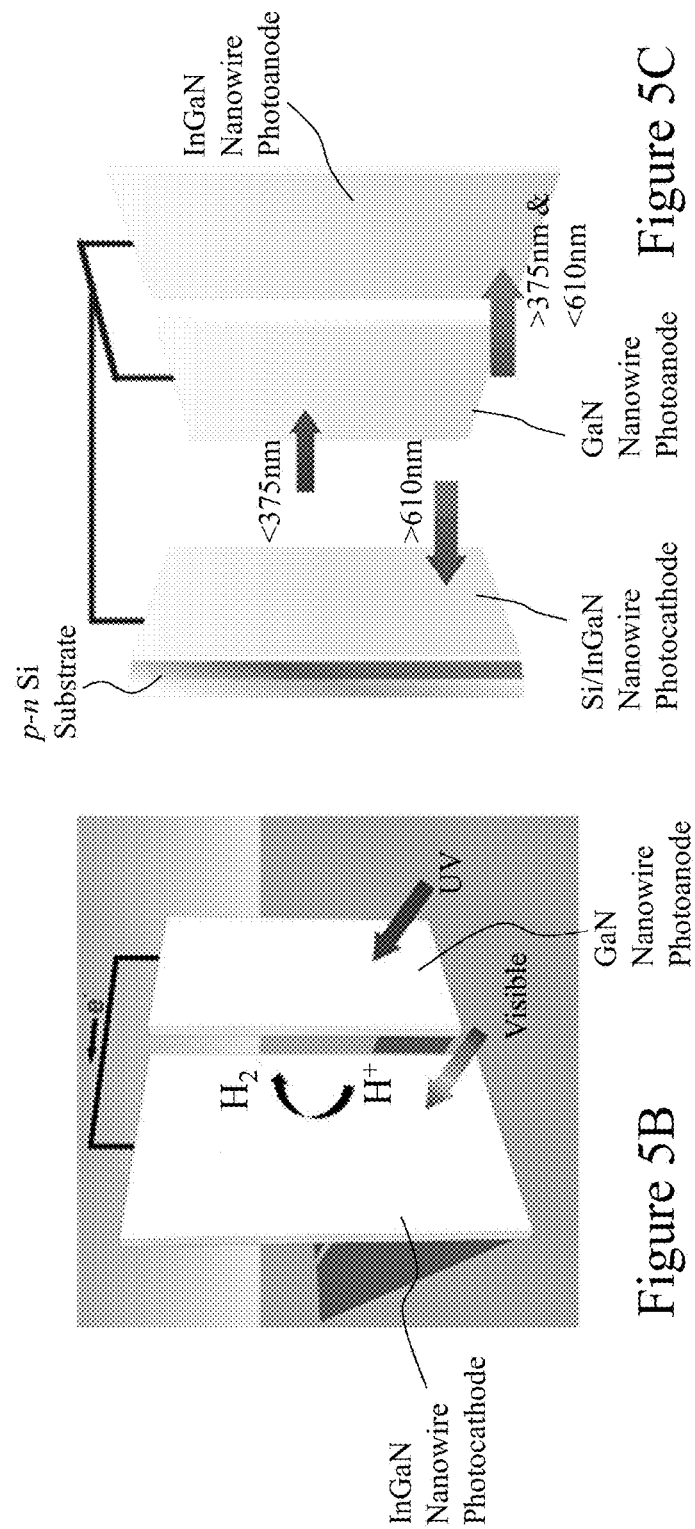
Figure 5B
Figure 5C

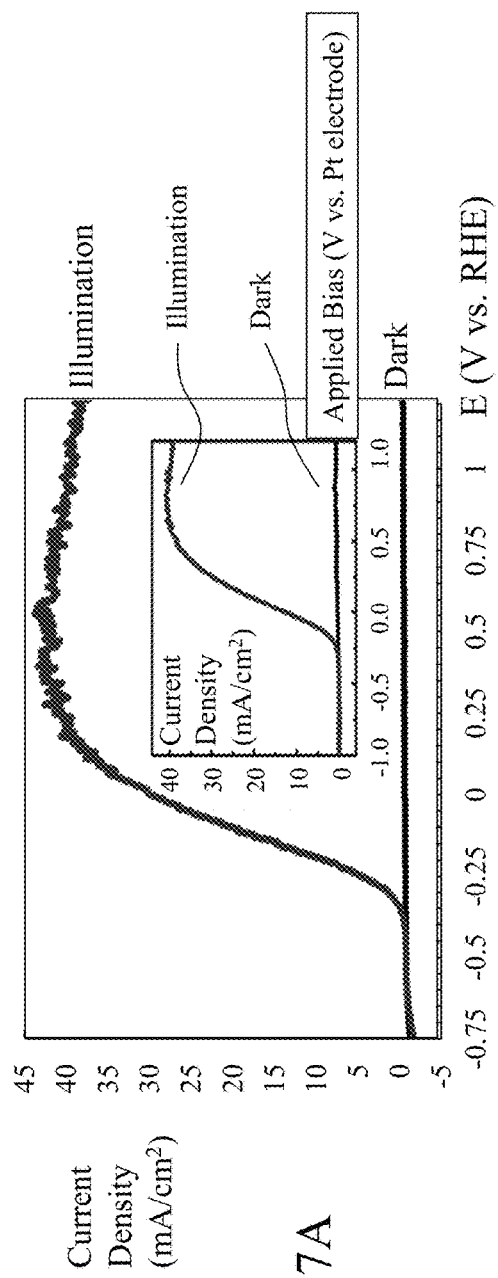
Figure 7A
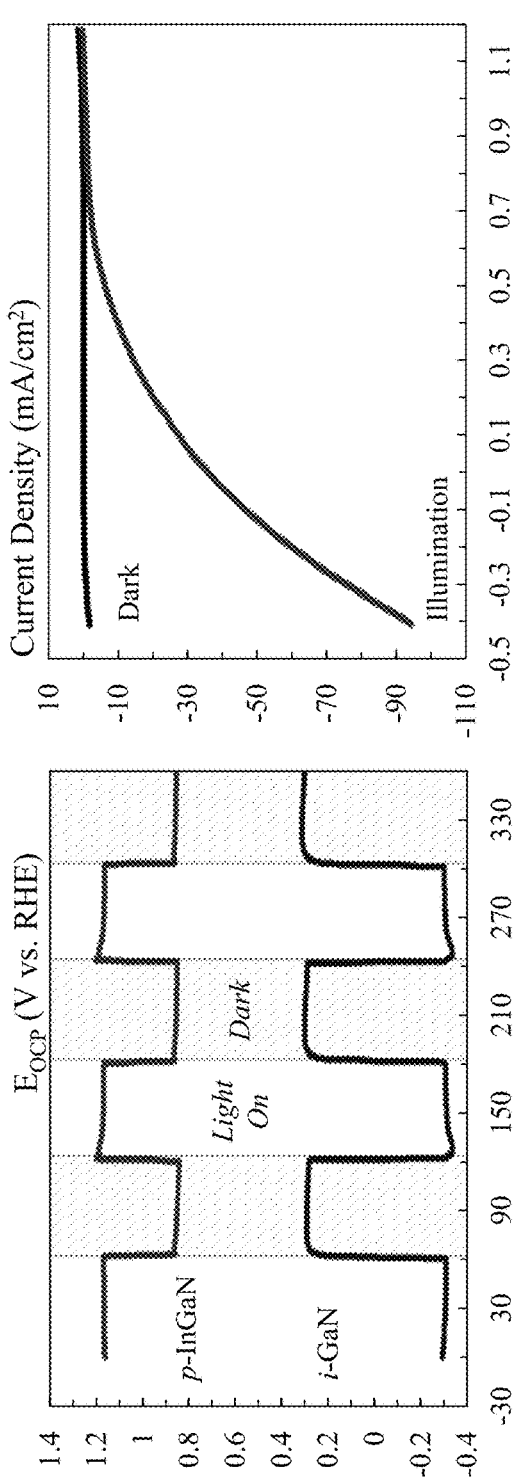
Figure 7B
Figure 7C

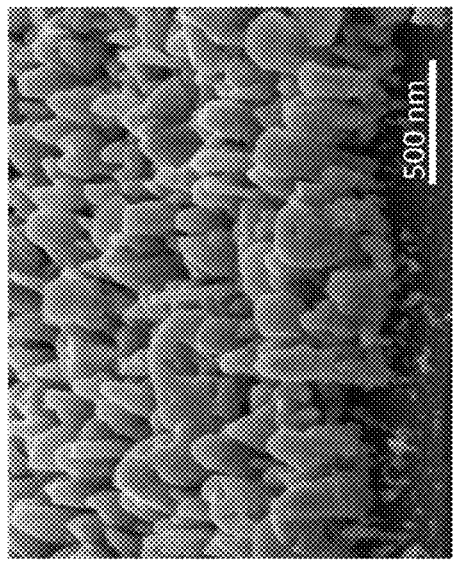
Figure 12
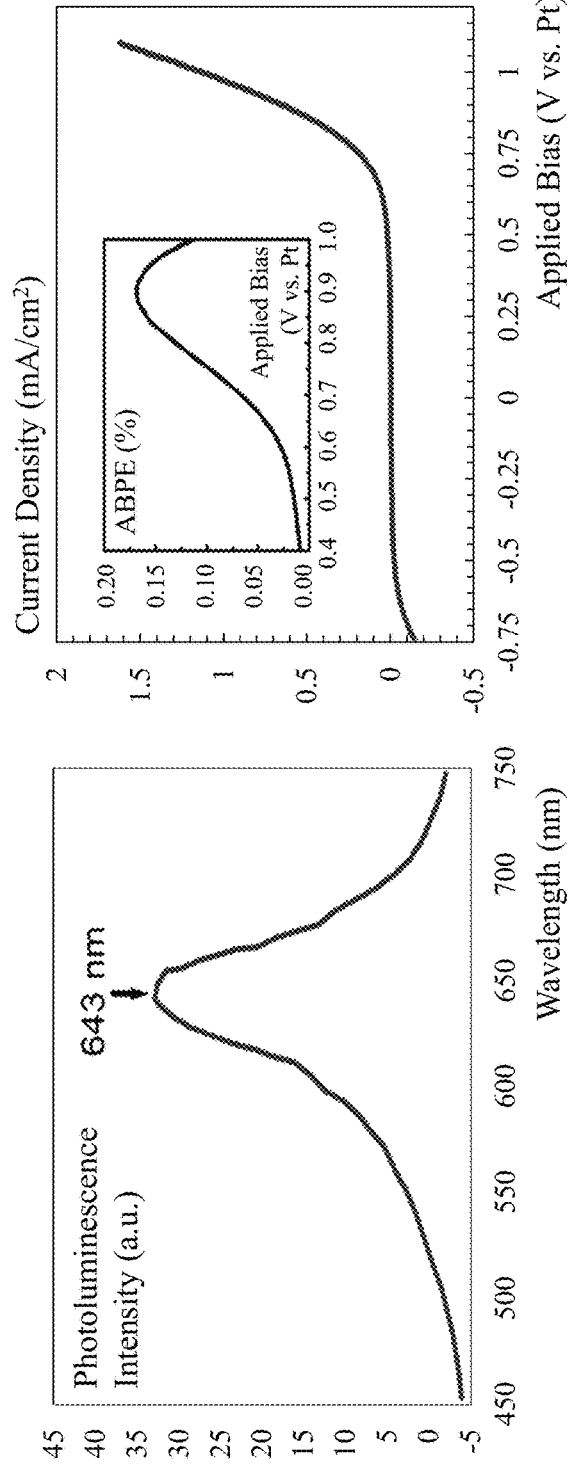
Figure 13
Figure 14

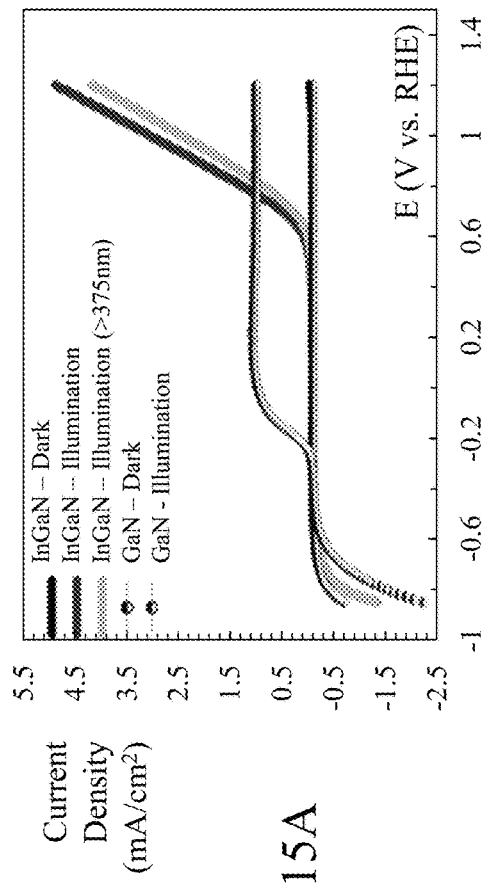
Figure 15A
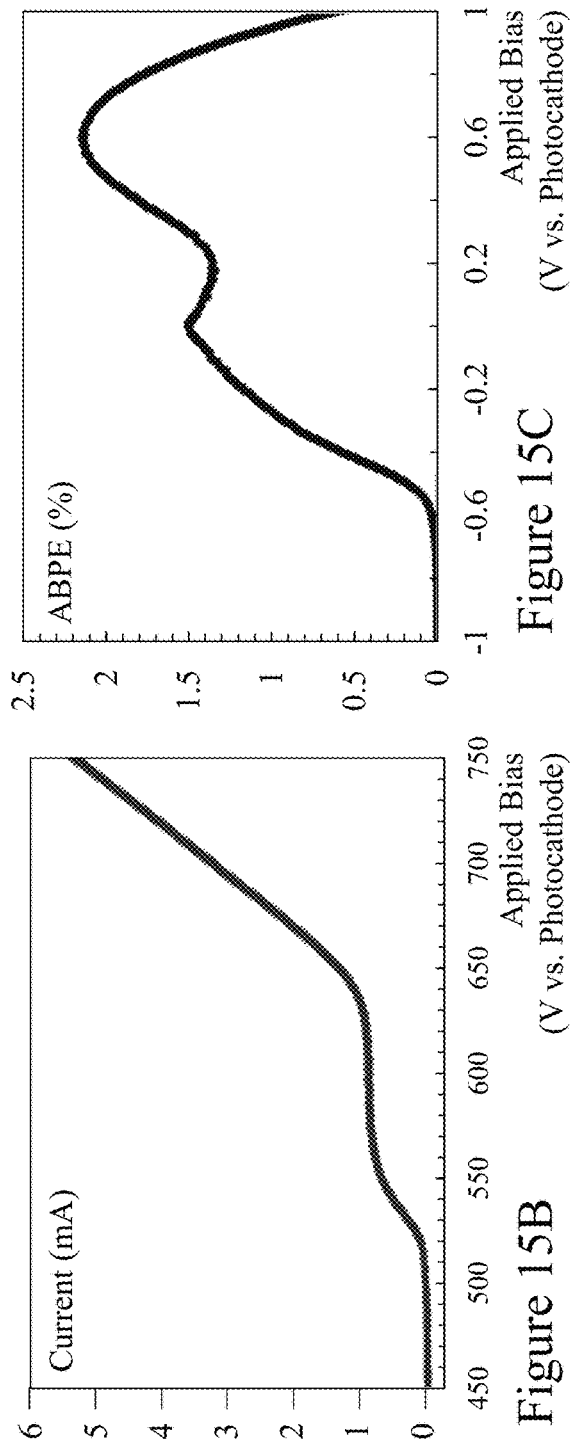
Figure 15B
Figure 15C

PHOTOCATHODES AND DUAL PHOTOELECTRODES FOR NANOWIRE PHOTONIC DEVICES

CROSS-REFERENCE TO RELATED APPLICATIONS

This patent application claims the benefit of priority from U.S. Provisional Patent Application 62/133,588 filed Mar. 16, 2015 entitled "Photocathodes for Nanowire Photonic Devices", the entire contents of which are incorporated herein by reference.

FIELD OF THE INVENTION

This invention relates to nanowire photonic devices and more particularly to photocathodes and dual photoelectrodes for nanowire photonic devices, photonic nanowire based chemical processing devices, and photonic nanowire based photoelectrochemical cells.

BACKGROUND OF THE INVENTION

Important components of direct solar based nanowire enabled chemical processing and electrochemical systems are a high efficiency and highly stable photocathode and 2-photon dual electrodes. The former enables photo-excited electrons lead to hydrogen ($H_2$) generation whereas the later with complementary energy bandgap photoanode and photocathode enables high efficiency, unassisted solar-driven water splitting.

Photocathode: Within the prior art extensive studies have been performed to develop photocathodes that can simultaneously absorb a large part of the solar spectrum and yield efficient charge carrier separation and proton reduction. However, in order to achieve this, the semiconductor light absorber should have a conduction band minimum (CBM) more negative than that required for hydrogen evolution reaction (HER), which is 4.44 eV below the vacuum level in solutions with pH=0. This requirement limits the choice of high efficiency semiconductor photocathodes primarily to silicon (Si) and a few III-V semiconductor materials, these including gallium phosphide (GaP), indium phosphide (InP) and their associated alloys. Various HER catalysts or protection layers integrated with Si exhibited improved performance compared to platinized p-Si photocathodes. Some other materials have also been studied, but are often limited by either rapid degradation or very poor absorption of visible light.

To effectively utilize photons within a wide range of the solar spectrum, a dual light absorber with a narrow bandgap material like Si at the bottom and direct wide-bandgap materials on top can provide energetic electrons for $H_2$ production. Accordingly, researchers have demonstrated that various heterostructures integrated with Si can exhibit improved performance compared with catalyst coated Si, e.g. platinized p.Si photocathodes. However, the design and performance of such multi-junction devices is limited by the current matching related issues between the two absorbers, because the carrier collection and extraction is only available on the front surfaces. For such photoelectrodes consisting of dual or multiple light absorbers, although the required external bias can be reduced, the photocurrent density is ultimately limited by the light absorber that provides the smaller maximum photocurrent density. Recently, the use of 1D nanostructures, such as nanowires, has been intensively studied, which can enable highly efficient carrier extraction and proton reduction on the large area lateral surfaces. To date, however, there have been no reports on such nanowire-based monolithically integrated multi-junction photoelectrodes.

Accordingly, it would be beneficial to leverage the high surface areas and self-contained conversion of direct solar illuminated hydrogen generation from such nanowires with multiple junctions for broad solar spectrum absorption by providing monolithically integrated multi-junction photocathodes.

Dual-Photoelectrode: Among the various photoelectrochemical (PEC) designs, a P-N dual-photoelectrode device, also commonly referred to as a photochemical diode, promises significant performance advantages and cost benefits. Such a 2-photon dual-electrode system can be implemented with two semiconductors connected back-to-back in tandem, forming the top and bottom photoelectrodes. In this scheme, minority carriers are driven to the semiconductor/liquid junction to perform oxidation/reduction reactions, while majority carriers recombine at the photocathode/anode interface. In a P-N dual-photoelectrode system, the electron-hole pair chemical potential can be made equal to, or greater than the largest band gap of the two semiconductors. As such, it can address the critical photovoltage bottleneck of a single-photoelectrode system, thereby leading to unassisted, solar-driven water splitting and hydrogen generation. Another fundamental advantage of the dual-photoelectrode system lies in that the two semiconductors can be designed to be complementary light absorbers. By separately optimizing the bandgap of the light absorption layers, the device efficiency can reach a theoretical maximum of 40%, and 29.7% considering reasonable energy loss processes. The P-N dual-photoelectrodes also offer several important advantages compared to photovoltaic-PEC (PV-PEC) and photovoltaic-electrolysis (PV-EL) technologies, including much simpler fabrication process, significantly reduced operation voltage, and potentially higher efficiency. Further, the simple 2-photon P-N dual-photoelectrode, PV-PEC or PV-EL photoelectodes can also be paired in a dual configuration to achieve improved solar-to-hydrogen efficiency.

In spite of their promise, conventional 2-photon tandem photoelectrodes generally exhibit very poor performance, with the commonly reported efficiency in the range of ~0.1%, which is significantly smaller than the best reported single photoelectrode (~1.8%) and PV-PEC devices (12.4%). However, within the prior art a specific instance of higher efficiency (~0.9%) has been demonstrated with haematite photoanode and amorphous Si photocathode with $NiFeO_X$ and $TiO_2$/Pt overlayers. In prior art tandem dual-photoelectrodes, dissimilar materials were used to provide complementary bandgaps and the resulting photovoltage small, limited by the material quality and incompatibility. Moreover, the device efficiency was severely compromised by the poor interfacial properties and, in many cases, by the performance of the Ohmic contact or tunnel junction connecting the electrodes. Further, due to the dissimilar material properties, the optimum performance of the two electrodes may require the use of different electrolytes. For example, prior art n-$WO_3$/p-Si dual tandem photoelectrodes only showed modestly enhanced photovoltage but with tremendous compromises in photocurrent and efficiency.

Accordingly, it would be beneficial to provide nanowire based dual-photoelectrode systems operable in acidic electrolyte which, together with a parallel illumination scheme, can fundamentally address these critical challenges. It would be further beneficial for these nanowire based dual-photoelectrode systems to exploit a semiconductor material family that can be tuned across the solar spectrum, can be doped both p-type and n-type and supported large current conduction.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to photocathodes and more particularly for photocathodes for nanowire photonic devices and photonic nanowire chemical processing devices.

In accordance with an embodiment of the invention there is provided a device comprising:
a first semiconductor material supporting absorption of photons within a first predetermined wavelength range;
a second semiconductor material supporting absorption of photons within a second predetermined wavelength range, a predetermined portion of the second predetermined wavelength range being longer than the first predetermined wavelength;
a third semiconductor material supporting absorption of photons within a third predetermined wavelength range, a predetermined portion of the third predetermined wavelength range being longer than the second predetermined wavelength; and
an adaptive double junction photocathode disposed between the first semiconductor material and the second semiconductor material.

In accordance with an embodiment of the invention there is provided a device comprising:
a first portion of the device supporting a photochemical catalytic reaction, the first portion absorbing photons within a first predetermined wavelength range;
a second portion of the device supporting the photochemical catalytic reaction, the second portion absorbing photons within a second predetermined wavelength range; and
an adaptive double junction photocathode disposed between the first portion of the device and the second portion of the device in order to allow photogenerated charge carriers with different over-potentials to be utilized in the photochemical catalytic reaction.

In accordance with an embodiment of the invention there is provided a device comprising:
a photoanode absorbing photons within a first predetermined wavelength range'
a photocathode absorbing photons within a second predetermined wavelength range; and
an optical assembly disposed between an external source of incident illumination and the photoanode and photocathode to filter the incident illumination such that incident illumination within the first predetermined wavelength range is coupled to the photoanode and incident illumination within the second predetermined wavelength range is coupled to the photocathode.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1C depicts schematically an $n^{++}$-p.Si solar cell wafer of the prior art together with p-InGaN/tunnel junction/n-GaN nanowires on $n^+$-Si and $n^{++}$-p.Si solar cell substrates according to embodiments of the invention;

FIG. 1D depicts a SEM image of integrated InGaN/Si photocathodes formed by InGaN tunnel junction nanowires according to an embodiment of the invention;

FIG. 1E depicts measured photoluminescence emission spectrum of nanowires according to an embodiment of the invention;

FIG. 2A depicts a STEM image of an InGaN tunnel junction nanowire with Pt nanoparticles according to an embodiment of the invention;

FIG. 2B depicts a high resolution STEM image showing Pt nanoparticles uniformly distributed on the p-InGaN segment of an InGaN tunnel junction nanowire according to an embodiment of the invention;

FIG. 2C depicts a high resolution STEM image showing Pt nanoparticles on both sides of the tunnel junction for an InGaN tunnel junction nanowire according to an embodiment of the invention;

FIG. 2D depicts a high resolution STEM image of the polarization enhanced tunnel junction structure for an InGaN tunnel junction nanowire according to an embodiment of the invention;

FIG. 2E depicts the geometric phase analysis (GPA) of the image depicted in FIG. 2D showing lattice expansion along the growth direction within the InGaN layer;

FIG. 2F depicts an elemental map of Pt within the selected area depicted in FIG. 2A showing an even surface coverage of Pt nanoparticles along the nanowire according to an embodiment of the invention;

FIG. 5A depicts a schematic of a dual-photoelectrode system under parallel illumination according to an embodiment of the invention, with the incident sunlight split spatially and spectrally on the photoanode and photocathode wherein each photoanode (or photocathode) may consist of several parallel-connected anodes (or cathodes), each of which is illuminated with a portion of the solar spectrum in commensurate with its energy bandgap and light absorption capacity such that whilst the current matching between the photoanode and photocathode is required, the current-matching for the parallel-connected photoanodes (or photocathodes) is not required, due to the parallel connection;

FIG. 5B depicts a schematic of a GaN nanowire photoanode and InGaN nanowire photocathode in a dual configuration according to an embodiment of the invention designed to absorb the UV and visible regions of the solar spectrum, respectively;

FIG. 5C depicts a schematic of the GaN and InGaN nanowire photoanodes according to an embodiment of the invention, which are connected in parallel and paired with the Si/InGaN photocathode in conjunction with spectrally and spatially split incident illumination to the photoelectrodes;

FIG. 7A depicts J-E curves of GaN nanowire photoanode according to an embodiment of the invention under dark and illuminated conditions exploiting a xenon lamp whilst the inset depicts the J-V vs. Pt electrode in a two-electrode configuration;

FIG. 7B depicts open-circuit potential ($E_{OCP}$) of the GaN nanowire photoanode and InGaN nanowire photocathode for a nanowire based device according to an embodiment of the invention wherein the potential difference between illuminated and dark conditions are ~0.6V and ~0.3V for the GaN photoanode and InGaN photocathode, respectively;

FIG. 7C depicts the J-E curve of InGaN nanowire photocathodes under dark and illumination conditions according to embodiments of the invention;

FIG. 12 depicts an SEM image of InGaN nanowire arrays according to an embodiment of the invention grown on Si(111) substrate;

FIG. 13 depicts the photoluminescence spectrum of InGaN nanowire photoanode according to an embodiment of the invention showing the peak at λ≈643 nm;

FIG. 14 depicts the J-V curve of the InGaN nanowire photoanode in the two-electrode configuration according to an embodiment of the invention, where the counter electrode is a Pt wire and the inset shows the ABPE of the InGaN nanowire photoanode;

FIG. 15A depicts J-E curves of the GaN and InGaN nanowire photoanodes for devices according to embodiments of the invention under dark and illumination conditions with an AM1.5G 1 sun solar simulator was used as the outer irradiation source together with the J-E curve of the InGaN nanowire photoanode under visible light illumination (375-610 nm);

FIG. 15B depicts the I-V curve of dual-photoelectrode devices according to an embodiment of the invention comprising GaN and InGaN nanowire photoanode and a Si/InGaN nanowire photocathode under dark and AM1.5G 1 sun illumination conditions with spectral and spatial splitting to provide illumination to the GaN nanowire photoanode, InGaN nanowire photoanode, and Si/InGaN nanowire photocathode were illuminated with λ<375 nm, 375 nm<λ<610 nm, and λ>610 nm respectively; and FIG. 15C depicts the power conversion efficiency of dual-photoelectrode devices according to an embodiment of the invention under AM1.5G 1 sun illumination.

DETAILED DESCRIPTION

Figure 1A:
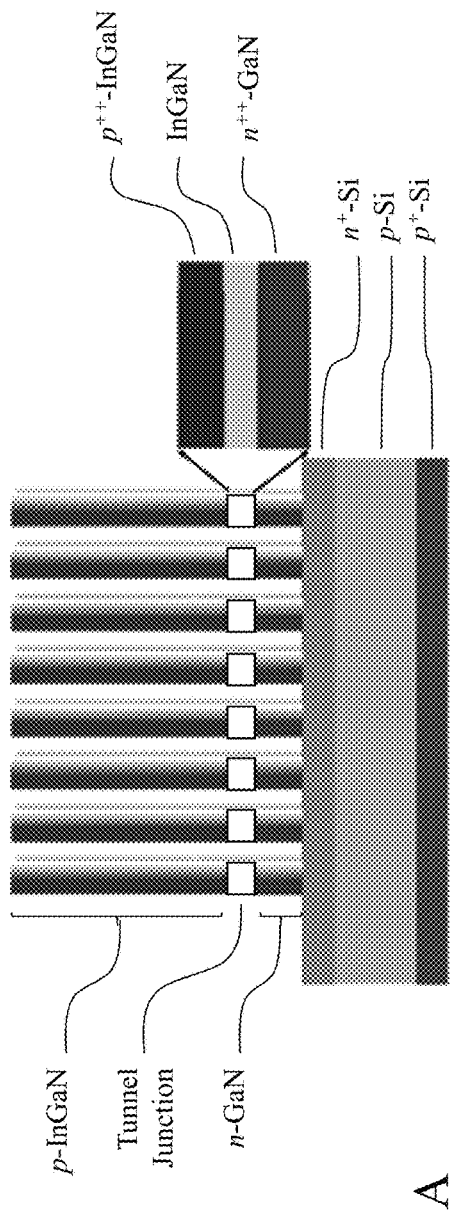
FIG. 1A depicts the design of integrated InGaN/Si photocathodes formed by InGaN tunnel junction nanowires according to an embodiment of the invention.

The present invention is directed to photocathodes and more particularly for photocathodes for nanowire photonic devices and photonic nanowire chemical processing devices.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A: Photocathode

A.1. InGaN Photocatalytic Hydrogen Generation & Tunnel Junction Photocathode Within the past 40 years of solar cell research and development devices employing silicon efficiencies rapidly reached efficiencies of 20-25% in single crystal, thin film single crystal, thick film silicon, and silicon heterostructures. Accordingly, in order to increase efficiencies for commercial large scale solar cells into the 40-45% range research has focused to multi-junction designs with two, three or four junctions in order to extend the portion of the solar spectrum employed into the near-infrared and mid-infrared regions. For example, a three junction solar cell may employ a silicon substrate with a germanium (Ge) bottom cell for the layer to absorb within the mid-infrared (1250 nm≤λ≤1850 nm), a middle cell of GaAs or InGaAs for the red to near-infrared (700 nm≤λ≤1250 nm), and top cell of InGaP for the blue-green region of the spectrum (400 nm≤λ≤700 nm). Between the top-middle cells and middle-bottom cells tunnel junctions are provided in order to allow flow of photonically generated carriers through the cell.

The inventors within U.S. Patent Application 2013/0,240,348 entitled High Efficiency Broadband Semiconductor Nanowire Devices" filed April 2013 and U.S. Provisional Patent Application 62/031,235 entitled "Methods and Systems Relating to Photochemical Water Splitting" filed August 2014 have demonstrated that compared to other semiconductor photocatalysts the band edges of InGaN can straddle the water oxidation and hydrogen reduction potentials under deep blue/blue visible light irradiation. In contrast crystalline silicon (c-Si) solar cells are primarily responsive under red/near-infrared light irradiation.

Accordingly, the inventors have established as described and depicted below dual junction photocatalyst exploiting InGaN atop a planar Si wafer and have further established the necessary tunnel junction photocathode. The novel adaptive double-junction photocathode exploits InGaN nanowire arrays atop the planar Si solar cell wafer. In this manner the maximum achievable current can exceed limits arising from current matching related issues. When compared to the conventional buried multi-junction light absorbers such adaptive junction can reduce chemical loss by allowing charge carriers with different over-potentials to participate in hydrogen evolution reaction (HER) and oxygen evolution reaction (OER) simultaneously.

Referring to FIG. 1A it is depicted schematically that the heterostructure device consists of a planar $n^+$-p.Si solar cell wafer and 150 nm n-GaN and 600 nm p-InGaN nanowire segments along the axial direction. The top InGaN nanowire arrays, with an indium composition of ~25%, are designed to absorb the ultraviolet and a large portion of the visible solar spectrum. The remainder of photons with λ<1.1 μm are absorbed by the underlying planar Si p-n junction. The n-GaN and p-InGaN are connected by a $n^{++}$-GaN/InGaN/$p^{++}$-GaN polarization-enhanced tunnel junction, which enables the transport of photoexcited holes from the p-InGaN to the n-GaN within each single nanowire. Accordingly, the current double-band photocathode differs from conventional tandem electrodes in that both the top InGaN and the bottom GaN/Si light absorbers can simultaneously drive proton reduction by taking advantage of the lateral carrier extraction scheme of nanowires. The theoretical maximum solar-to-hydrogen (STH) efficiency of such a double band device is ~26%.

Figure 1B:
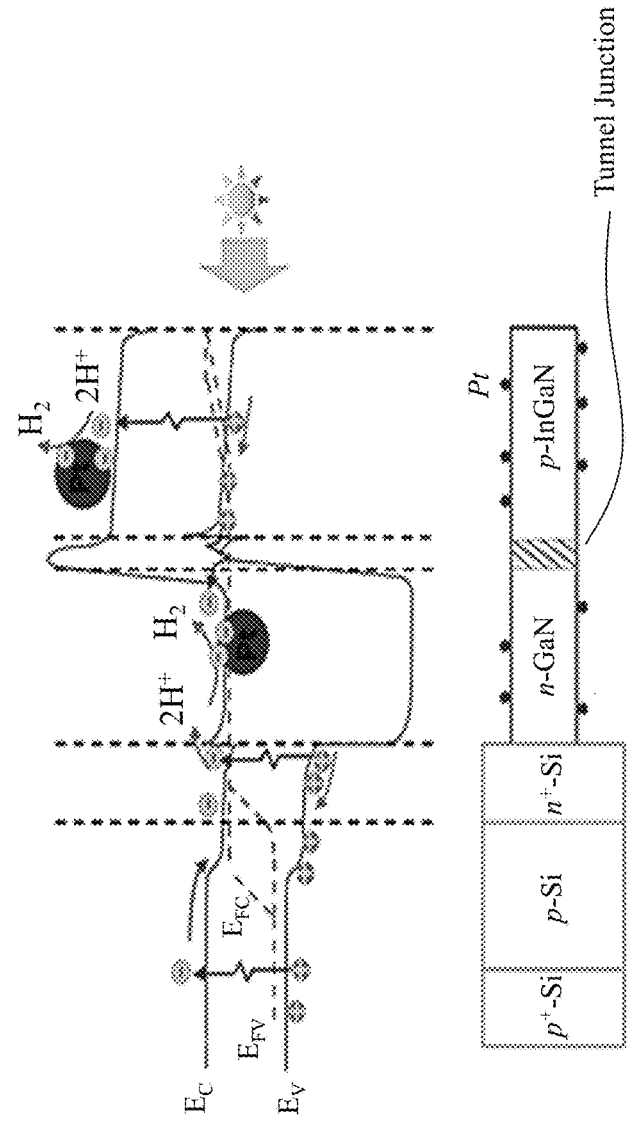
FIG. 1B depicts the energy band diagram of InGaN tunnel junction nanowires according to an embodiment of the invention under illumination.

Now referring to FIG. 1B, there is depicted the energy band diagram along the vertical direction of the heterostructures described in respect of FIG. 1A. Due to the relatively small offset between the Si and GaN conduction band edges and the heavy n-type doping, photo-excited electrons of the underlying Si solar cell can readily inject into the n-GaN nanowire segment. The electron affinity of n-Si is well established as 4.05 eV. The electron affinity of n-GaN within the literature is within the range 3.5 eV to 4.1 eV. It has also been established in the literature that the n-GaN/n-Si heterointerface has a negligibly small energy barrier for electron transport. Within this work by the inventors, both the Si and GaN were heavily n-type doped to facilitate electron transfer at the GaN/Si interface. Accordingly, under illumination, the collected photoexcited electrons of the $n^+$-Si can effectively inject into the GaN—Si nanowire segment at a small applied bias. The injected electrons can drive proton reduction on the lateral surfaces of GaN nanowires or recombine with holes injected from the p-InGaN nanowires in the tunnel junction.

Referring to FIG. 1C, there are depicted schematically illustrations of the $n^+$-p.Si solar cell wafer 100A together with p-InGaN/tunnel junction/n-GaN nanowires on $n^+$-Si substrate 100B and p-InGaN/tunnel junction/n-GaN nanowires on $n^{++}$-p.Si solar cell substrate according to embodiments of the invention. The p-InGaN/tunnel junction/n-GaN nanowires have identical structures wherein the p-InGaN consists of six InGaN segments separated by ~15 nm p-type GaN/InGaN short period superlattices to minimize the In phase separation during the MBE growth process and also to facilitate hole transport along the vertical direction of the nanowires. The tunnel junction consists of $n^{++}$-GaN of thickness 20 nm, $In_{0.4}Ga_{0.6}N$ of thickness 4 nm, and $p^{++}$-GaN of thickness 20 nm.

A large portion of the injected electrons can drive proton reduction on GaN surfaces, with the rest recombining with holes from the p-GaN in the tunnel junction. It would be evident to one of skill in the art that the unique design, with the use of GaN-nanowire/Si as the bottom light absorber, can surpass the restriction of current matching in conventional dual absorber devices and, at the same time, provide energetic photo-excited electrons to the HER catalyst.

A.2. Manufacturing InGaN Nanowire-Silicon Solar Cells

A.2.1 Fabrication of $n^+$-p.Si Solar Cell Substrates

The $n^+$-p.Si solar cell wafers were created using a standard thermal diffusion process. The front and back side of a double side polished p-doped Si wafers (thickness 256 μm-306 μm, resistivity ρ≈1-10 Ω·cm) were first covered with phosphorus and boron dopants by spin coating, respectively. Subsequently, the samples were baked at 950° C. for 20 minutes under a $N_2$ flow rate of 200 sccm in a diffusion furnace. The thermal diffusion process leads to the formation of an n+ emitter layer and a p+ electron back reflection layer on the front side and back side of the Si wafer, respectively. The sheet resistivity of the n+ emitter layer was in the range of $\rho_{N+}$≈8-14 Ω/sq, corresponding to donor concentrations of ~$5 \times 10^{20}$ cm$^{-3}$. For the p+ back reflection layer, the sheet resistivity was in the range of $\rho_{P+}$≈30-60 Ω/sq, corresponding to acceptor concentrations of ~$1.5 \times 10$ cm$^{-3}$. Such solar cell wafers were used for the molecular beam epitaxy (MBE) growth of InGaN nanowire arrays. In addition, Si solar cell devices were realized by depositing Ti/Au metal contacts onto the top of the n+ emitter layer and Ni/Au metal contacts onto the p+ backside, followed by an annealing at 550° C. for 2 minutes.

A.2.2 Molecular Beam Epitaxial Growth

Catalyst-free InGaN/GaN nanowire arrays were grown on both n$^+$-Si substrate and n$^+$-p.Si solar cell wafers by radio frequency plasma-assisted MBE. See U.S. Pat. No. 8,563,395 entitled "Method of Growing Uniform Semiconductor Nanowires without Foreign Catalysts and Devices Thereof," U.S. Pat. No. 8,669,544 entitled "High Efficiency Broadband Semiconductor Nanowire Devices and Methods of Manufacture," and U.S. Patent Application 2013/0,240,348 "High Efficiency Broadband Semiconductor Nanowire Devices and Methods of Manufacture" provide background on the inventor's catalyst-free manufacturing techniques for high uniformity nanowires with varying semiconductor structures and compositions.

The surface oxide of the Si was first removed using buffered hydrofluoric (HF) acid before loading into the MBE chamber. The substrate was further degassed in situ at ~800° C. before growth initiation. Subsequently, InGaN/GaN nanowire structures were grown under nitrogen rich conditions with the following growth parameters:

a N$_2$ flow rate of 1 sccm;
forward plasma power of 350 W;
Ga flux in the range of $4.5\times10^{-8} \leq Ga \leq 8\times10^{-8}$; and
In flux in the range of $4.0\times10^{-8} \leq Ga \leq 8\times10^{-8}$.

The substrate temperature was varied in the range of 650° C.$\leq T_{SUB} \leq$780° C. Si and Mg were used as the n and p type dopants, respectively. As depicted in FIG. 1 C the tunnel junction consisted of 20 nm(n$^{++}$-GaN):4 nm(InGaN):20 nm(p$^{++}$-GaN), which were grown at slightly lower substrate temperatures ~650°° C. to enhance In incorporation.

A.2.3 Fabrication of the Nanowire Working Electrode

Within the experiments described below, the nanowire samples were typically cut into square shapes with sizes in the range 0.35-0.70 cm$^2$ which were platinized by the following photodeposition process. Photodeposition of Pt nanoparticles on as-grown GaN/InGaN nanowires was conducted under vacuum in a sealed glass reactor with a quartz lid. A UV-enhanced 300 W Xenon lamp was used to shine light from the top quartz lid. The sample was immersed within a mixed solution of methanol (12 mL) and deionized water (50 mL). 20 μL of 1 mM Chloroplatinic acid hydrate (H$_2$PtCl$_6$.xH$_2$O) was used as Pt precursor. Under illumination, photo-excited holes from nanowires are consumed by methanol while the Pt precursor is reduced to form Pt nanoparticles on the surface of nanowires. A thin layer of In—Ga eutectic was then applied on the backside of the Si substrate, which was attached to a copper wire by silver paste. After drying in air, the working electrode was prepared by capsuling the sample backside and edge with epoxy, with only nanowires on the growth front exposed in solution.

A.2.4 Fabrication of Platinized n$^+$-p.Si Substrate and ITO

The n$^+$-p.Si substrate was rinsed by buffered HF solution for 2 minutes to remove the surface oxide layer, and was subsequently loaded into an electron beam evaporation chamber to deposit ~1 nm Pt. The ITO substrate (ρ~12 Ω·cm) was deposited with ~1 nm Pt by electron beam deposition as well.

A.3. Structural Characterization of Fabricated InGaN Nanowire on N$^+$-p.Si Solar Cell Substrates In addition to growth of the GaN/InGaN nanowires on the n$^+$-p.Si solar cell wafers control GaN/InGaN nanowires on n$^+$-Si were also grown as depicted in FIG. 1C. Due to the large bandgap, conventional GaN p$^{++}$/n$^{++}$ junctions generally have very low tunneling efficiency. Within the designs implemented by the inventors the polarization-enhanced tunnel junction consists of n$^{++}$-GaN of thickness 20 nm. In$_{0.4}$Ga$_{0.6}$N of thickness 4 nm, and p$^{++}$-GaN of thickness 20 nm are intended to overcome this limitation. On top of the tunnel junction, ~600 nm p-InGaN nanowires were grown. Referring to FIG. 1D, there is depicted a scanning electron microscope (SEM) image of such nanowires. It is seen that such nanowires are vertically aligned on the Si substrate, with relatively uniform lengths of ~800 nm and diameters varying from ~50-150 nm. The inventors from previous work, referenced supra in respect of their patents and Li et al in "Photo-Induced Conversion of Methane into Benzene over GaN Nanowires" (J. Am. Chem. Soc., Vol. 136, 7793-7796), have established that nanowires are N-polar whilst their sidewalls are nonpolar m-plane. Referring to FIG. 1E, there is depicted the photoluminescence emission spectrum measured at room-temperature using a 325 nm Cd—He laser as the excitation source where the photoluminescence emission was spectrally resolved by a high resolution spectrometer and detected using a photomultiplier tube. As can be seen the peak wavelength is at $\lambda_{PEAK}$≈520 nm, corresponding to an average indium composition of ~25% and an energy bandgap of ~2.39 eV. Therefore, photoexcited electrons in p-InGaN can in principle reduce protons without external bias. The downward surface band bending of p-InGaN facilitates the flow of electrons towards the electrolyte. In addition, the accumulation of photoexcited holes in p-InGaN and their transport across the tunnel junction can enhance the injection of photoexcited electrons from the n$^+$-p.Si substrate towards the n-GaN beneath the tunnel junction. As a result, the total interfacial resistance at the n$^+$-Si/n-GaN and the tunnel junction is expected to be lower in the presence of p-InGaN.

Figures 3A, 3B, 3C:
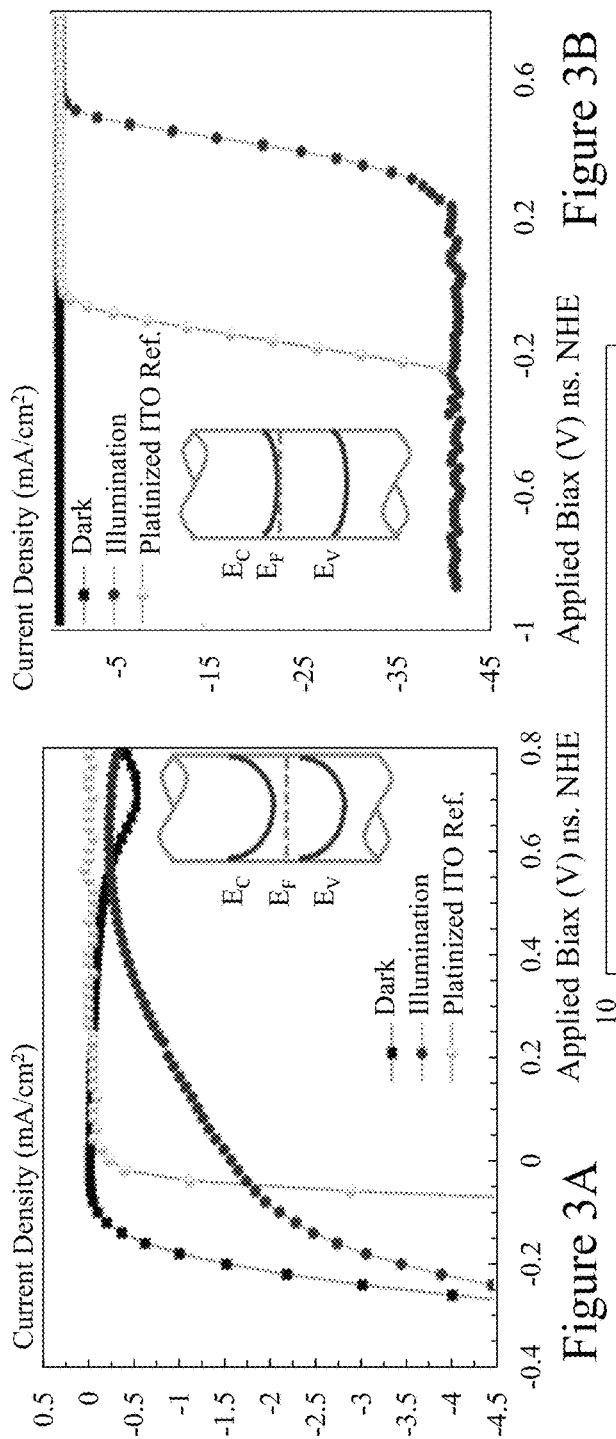
FIG. 3A depicts the variation in current density with applied voltage versus NHE for InGaN tunnel junction nanowires on $n^+$-Si substrates according to embodiments of the invention
FIG. 3B depicts the variation in current density with applied voltage versus NHE for reference platinized ITO substrate together with prior art $n^+$-p.Si solar cell, n-GaN on $n^+$-p.Si substrate, and p-InGaN tunnel junction nanowires on $n^+$-p.Si substrates InGaN tunnel junction nanowires on $n^+$-p:Si substrates according to embodiments of the invention
FIG. 3C depicts solar-to-hydrogen efficiency for photocathode formed by InGaN tunnel junction nanowires on $n^+$-p.Si substrates according to embodiments of the invention.

In addition to absorbing the ultraviolet and a portion of the visible photons, such nanowire arrays can lead to highly efficient light trapping and significantly enhance the light absorption of the underlying Si substrate as evident from FIG. 3B where the current density of reference substrate, prior art solar cell and embodiments of the invention are presented as a function of applied bias versus NHE. The n$^+$-p.Si solar cell wafer was initially platinized using electron beam evaporation. With a nominal thickness of 1 nm, Pt nanoparticles were formed on the Si surface, which were sufficient for HER but did not block the incident light. As shown in FIG. 3B, the platinized n$^+$-p.Si substrate exhibits an onset potential of 0.36V vs. NHE for a photocurrent density of −2 mA·cm$^{-2}$. A saturated photocurrent density of −22.7 mA·cm$^{-2}$ was reached at $V_{NHE}$=−0.17V. The relatively low saturated current density of the n$^+$-p.Si solar cell wafer, compared to the theoretical value of −56.15 mA·cm$^{-2}$ under 1.3 sun illumination, is directly related to the light reflection as well as the non-optimal Pt loading on Si surface. During the e-beam deposition process, Pt nanoparticles may not necessarily nucleate at the active sites of HER. In addition, any remnant native SiO$_X$ can cause bleaching of some Pt nanoparticles during the subsequent photoelectrochemical measurements. In contrast, the photocathode of platinized n-GaN on n$^+$-p.Si substrate provides an onset potential of 0.5V vs. NHE and a saturated photocurrent density of ~35 mA·cm$^{-2}$ at $V_{NHE}$=0.2V. Also depicted is the curve for p-InGaN tunnel junction nanowires on n$^+$-p.Si substrate with a saturated photocurrent density of ~40 mA·cm$^{-2}$. Also depicted is a reference platinized ITO substrate.

The performance of the underlying Si solar cell substrate is significantly improved with the integration of InGaN/GaN nanowire arrays which arises from the enhanced light trapping effect, reduced non-radiative surface recombination, and efficient carrier extraction by the platinized GaN:Si nanowire segment. The light trapping effect of nanowire arrays is known from photovoltaic applications. InGaN/GaN nanowire arrays have subwavelength dimensions and can strongly scatter the incident light, which significantly enhances the light absorption of the underlying $n^+$-p.Si substrate. Further, the large valence band offset of ~2 eV at the n-GaN/$n^+$-Si heterointerface blocks the photoexcited holes from the Si and acts as a back surface field in the solar cell, reducing the surface recombination of photoexcited charge carriers within the Si. Studies by the inventors on equivalent InGaN/GaN nanowire arrays grown on $n^+$-Si substrate have shown that such nanowires could generate a photocurrent density of −5 mA·cm$^{-2}$ under 1.3 sun illumination conditions. Accordingly, the photocurrent density generated by proton reduction from the bottom n-GaN segment of nanowires, due to the injection of photoexcited electrons from the underlying Si solar cell substrate, is estimated to be ~36 mA·cm$^{-2}$.

Structural properties of p-InGaN tunnel junction nanowires were further characterized using scanning transmission electron microscopy such as referring to FIG. 2A wherein a fairly uniform distribution of Pt nanoparticles on the InGaN/GaN nanowire surfaces can be clearly seen. Detailed STEM analysis was performed using a double aberration-corrected STEM system operated at 200 kV. Atomic-resolution, atomic-number sensitive (Z-contrast) STEM-high-angle annular dark-field (HAADF) images were obtained using a detector angular range of 63.8-200 mrad. Elemental mapping by electron energy-loss spectroscopy (EELS) in STEM mode was done with the N K, In $M_{4,5}$, Ga $L_{2,3}$, and Pt $M_{4,5}$-edges and the spectrum imaging technique. Weighted-principal component analysis (PCA) was applied to the spectrum images for noise-reduction of the Ga-, and Pt-signals in their respective elemental maps. Geometric phase analysis (GPA) was also applied to atomic-resolution HAADF images where necessary.

This detailed STEM analysis, shown in FIG. 2B, reveals that the crystalline Pt nanoparticles have diameters of 2-3 nm. The tunnel junction is identified in FIG. 2C. It is evident that nearly identical Pt nanoparticles are deposited on both sides of the tunnel junction, i.e. the p-(In)GaN and n-GaN nanowire segments. Therefore, HER can occur on both sides of the tunnel junction provided that there are photo-excited electrons. A high resolution STEM image of a $n^{++}$-GaN/InGaN/$p^{++}$-GaN tunnel junction is further depicted in FIG. 2D showing that the InGaN layer has a thickness of ~4 nm and that the nanowire is free of any structural defects/dislocations. Geometric phase analysis (GPA) across the tunnel junction region revealed the distribution of out-of-plane lattice expansion across the InGaN segment, shown in FIG. 2E, due to the incorporation of the large In atoms. The even distribution of Pt nanoparticles along the nanowire is most evident in the Pt elemental map in FIG. 2F. Both Pt nanoparticles on the nanowire side surfaces and on surfaces viewed in projection are visible, with direct correspondence to the brightest features in FIG. 2A confirming them as Pt nanoparticles.

A.4. Photoelectrochemical Characterisation of Fabricated InGaN Nanowires on $n^+$-p.Si Solar Cell Substrates Photoelectrochemical reaction experiments were conducted in 1M HBr solution, with InGaN/GaN, silver chloride (Ag/AgCl) and Pt as the working, reference, and counter electrodes, respectively. A 300 W Xenon lamp with an AM1.5G filter was used as the light source, with incident light intensity ~130 mW·cm$^{-2}$. Linear sweep voltammograms (LSVs) of platinized InGaN tunnel junction nanowires on $n^+$-Si substrates and platinized InGaN tunnel junction nanowires on $n^+$-p.Si substrates were conducted, as presented with FIGS. 3A and 3B respectively. An LSV of platinized $n^+$-p.Si solar cell wafer is shown FIG. 3B. For InGaN tunnel junction nanowires grown on $n^+$-Si substrate, the onset potential, corresponding to a photocurrent density of −2 mA·cm$^{-2}$ is at $V_{HNE}$=−0.08V. With more negatively applied potential, the current density increased with or without illumination. In this regime the platinized nanowires behave as HER catalyst. The very small onset potential and high resistance is largely due to the nanowire surface depletion effect and the resulting poor current conduction, schematically shown in the inset of FIG. 3A. Dramatically improved performance, however, was measured when InGaN tunnel junction nanowire arrays were integrated on the $n^+$-p.Si solar cell wafer. Referring to FIG. 3B then, under illumination, the onset potential of InGaN tunnel junction nanowires on $n^+$-p.Si substrate is at $V_{HNE}$=0.5V (for the same current density of −2 mA·cm$^{-2}$). The significantly enhanced onset potential of photocurrent confirms the additional photo-voltage provided by the underlying Si solar cell. A saturated photocurrent density of −40.6 mA·cm$^{-2}$ was reached at $V_{HNE}$=0.26V and remained constant with more negative bias. The photocathode requires an external bias $|V_b|$ versus counter electrode to drive the overall water splitting. Therefore, the ABPE was calculated using Equation (1) where $V_b$ is the applied potential versus an ideal counter electrode.

$$APBE = \frac{J[mA \cdot cm^{-2}] \times V[V vs NHE]}{130[mA \cdot cm^{-2}]} \times 100\% \quad (1)$$

Referring to FIG. 3C then a maximum APBE efficiency of 8.7% was obtained at $V_{NHE}$=0.33V. The maximum ABPE was also verified to be the same in a 2-electrode PEC system with Pt wire as the counter electrode. It is worthwhile mentioning that, among the many samples we investigated, variations of the saturated photocurrent density were within 2 mA/cm$^2$, and the maximum ABPE was obtained at $V_{NHE}$ between 0.25 V and 0.35 V. These variations are likely related to the sample surface preparation conditions and other factors. Within these experiments, the total photon flux that can be possibly absorbed by GaN/InGaN and Si is $3.51 \times 10^{17}$ photon·s$^{-1}$·cm$^{-2}$. Therefore, the saturated photocurrent density of −40.6 mA·cm$^{-2}$ corresponds to an average incident-photon-to-current-efficiency (IPCE) of 72.3% over the solar spectrum from 280 nm to 1100 nm. In a 3-electrode PEC system, the polarization curves of photocathodes in 1 M HNO$_3$ were found to be nearly identical to those obtained in 1 M HBr. In addition, under concentrated solar illumination, we observed a drop in the ABPE, which is likely caused by bubbling resistance and limited mass diffusion of protons at the semiconductor-liquid interface.

Within the inventive double-band photocathode, the photocurrent density generated by the top InGaN nanowire absorber is estimated to be ~−5 mA·cm$^{-2}$. To verify the effect of top p-InGaN nanowire segments, the inventors tested n-GaN nanowires grown on identical $n^+$-p.Si substrate to compare with the p-InGaN tunnel junction nanowires, as shown by the polarization curves in FIG. 3B. The saturated photocurrent density of n-GaN nanowires on $n^+$-p.Si substrate is 35 mA·cm$^{-2}$, higher than the current density of 23 mA·cm$^{-2}$ from platinized $n^+$-p.Si, but lower than the current density of 40.6 mA·cm$^{-2}$ obtained from p-InGaN tunnel junction nanowires on $n^+$-p.Si substrate. With the incorporation of nanowires, the measured saturated photocurrent density can greatly surpass that of the platinized n$^+$-p.Si This can arise where the electron current from the Si solar cell substrate can be injected directly to the GaN:Si nanowire segment, schematically shown in FIG. 1B, due to the small conduction band offset between Si and GaN. The significantly increased electron concentration in GaN nanowires can reduce the depletion region width and thereby the resistance, illustrated in the inset of FIG. 3B. Further, electrons can readily migrate to the surface of GaN nanowires for proton reduction, due to the reduced surface band bending and the highly uniform Pt nanoparticle coverage on the nanowire surfaces, see FIGS. 2A to 2C and 2F respectively. Therefore, the superior performance of n-GaN nanowires on n$^+$-p.Si substrate compared with platinized n$^+$-p.Si can be attributed to the anti-reflection effect, enhanced carrier extraction of n-GaN nanowires, and improved semiconductor/Pt/electrolyte interface (GaN/Pt/electrolyte versus Si/Pt/electrolyte). The performance of the photocathode was further improved with the incorporation of p-InGaN nanowire segments on top of n-GaN with the assistance of a tunnel junction, which is due to the reduced HER resistance and interfacial series resistance when p-InGaN is activated under visible light. Evidently, the unique lateral carrier extraction of 1D nanowires can significantly enhance proton reduction and, in doing so, also surpass the limitations of current matching required by conventional multi-junction planar photoelectrodes. Moreover, the InGaN tunnel junction nanowire arrays play a critical role in enhancing the performance of the underlying Si solar cell, due to the enhanced light absorption, efficient carrier extraction and reduced surface recombination.

Figure 4A:
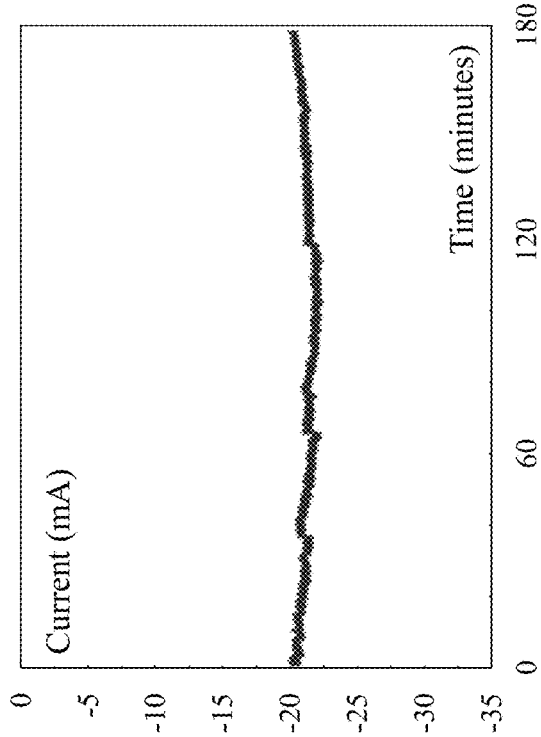
FIG. 4A depicts photocurrent versus time for InGaN tunnel junction nanowires according to an embodiment of the invention at an applied bias of 0.06 V versus NHE under illumination.

The inventors have further studied the stability of the integrated InGaN/Si photocathodes. InGaN nanowire photocathodes can exhibit a relatively high level of stability at a bias close to the equivalent HER potential. As depicted in FIG. 4A the current remains nearly constant and no significant degradation was measured for the duration of 3 hours. The chemical stability of defect-free III-nitride nanowire photocatalysts has been previously reported and has been explained by the strong ionic bonding characteristics, compared to other III-V semiconductors, which can lead to the absence of surface states in the fundamental energy bandgap. In this work, the inventors have also observed rapid degradation of some InGaN/Si photocathodes. The inventors observing that in these samples the performance degradation is related to the shift of the onset potential, rather than the reduction of the saturated photo-current density. During the epitaxial growth of GaN nanowires on Si, a thin (~2 nm) SiN$_X$ layer may form. The degradation is likely related to the etching of the SiN$_X$ at the GaN/Si heterointerface in solution, among other factors, which increases interface resistance and thereby shifts the onset potential. The formation of such an amorphous layer, however, highly depends on the surface preparation conditions of the Si substrate, which may contribute to the observed variations in the device stability.

Figure 4B:
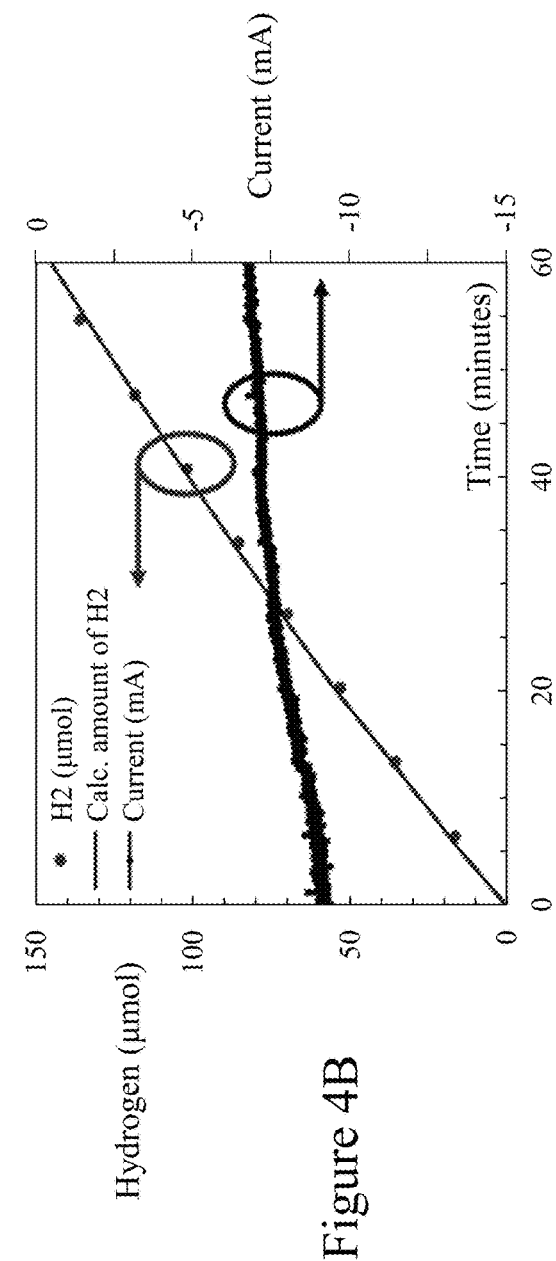
FIG. 4B depicts $H_2$ generation versus time for InGaN tunnel junction nanowires according to an embodiment of the invention at an applied bias of 0.26 V versus NHE under illumination.

In order to evaluate the Faradic efficiency, the inventors analyzed the H$_2$ generated from the monolithically integrated photocathode using a gas chromatograph equipped with a thermal conductivity detector. A potentiostat was employed with a three-electrode electrochemical testing system includes an Ag/AgCl, a Pt wire, and a monolithically integrated InGaN/GaN/Si photocathode. A 300 W Xenon lamp was used whilst H$_2$ evolution was measured using the three-electrode configuration at 0.26V versus NHE in a vacuum sealed quartz chamber under 1.3 sun conditions. The light intensity was calibrated using both a thermopile and a photodiode sensor with attenuator. The evolved H$_2$ gas was sampled using an air tight syringe and analyzed by a gas chromatograph equipped with a thermal conductivity detector and argon carrier gas. Depicted in FIG. 4B are the photocurrent density and the H$_2$ evolution results measured simultaneously at V$_{NHE}$=0.26V. The slight difference in the operation voltage compared to the maximum efficiency shown in FIG. 3B is related to sample variations. The Faraday efficiency was calculated using Equation (2) where F represents the Faraday constant (96485 C/mol), I is the measured current, T$_0$ is the time duration, and n$_{H2}$ is the total amount of H$_2$ produced. By correlating the measured current with H$_2$ production, the Faraday efficiency was derived to be in the range of 97% to 105% during the measurements (~1.5 hr). Considering the error bar (~10%) of H$_2$ sampling and analysis, it is concluded that near-unity Faraday efficiency can be achieved.

$$\eta_{FARADAY} = \frac{2 \times n_{H2}(t = T_0)[\mu mol] \times 10^6 \times F}{\int_0^{T_0[s]} I[mA] \cdot dt \times 10^3} \times 100\% \quad (2)$$

Accordingly, the inventors have shown that, exploiting the lateral carrier extraction scheme of 1D nanowire structures, the generation of equal numbers of charge carriers within the bottom and top junctions is no longer required, thereby providing tremendous flexibility in optimizing the design and efficiency of multi-junction photoelectrodes. Such an adaptive tandem cell can also be designed as a photoanode to perform water oxidation. It is expected that further enhanced efficiency and improved stability can be achieved by using a conformal protective layer on the device surface, including the uncovered Si surface and InGaN/Si heterointerface, and by optimizing the efficiency of the underlying solar cell wafers.

It would be evident to one skilled in the art that the principles described with respect to embodiments of the invention may be applied to other semiconductor photoabsorbers employing semiconductor alloys including, but not being limited to, those absorbing different wavelength ranges and exploiting indium (In), aluminum (Al), gallium (Ga), phosphorous (P), and nitrogen (N).

It would be evident to one skilled in the art that the principles described with respect to embodiments of the invention may be applied to other catalysts including, but not limited to, titania (TiO$_2$) nanoparticles and Rh/Cr$_2$O$_3$ core-shell catalytic nanoparticles.

B: Dual-Photoelectrode

B.1 Concept

As noted supra it would be beneficial to provide nanowire based dual-photoelectrode systems to exploit a semiconductor material family that can be tuned across the solar spectrum, can be doped both p-type and n-type and supported large current conduction. Amongst the multiple semiconductor material families metal nitrides, e.g. InGaN, can be doped n-type or p-type and can support large current conduction. Further, to date this is the only material family whose energy band can be tuned across nearly the entire solar spectrum and whose band edges can uniquely straddle the H$^+$/H$_2$ and H$_2$O/O$_2$ redox potentials under deep visible and near-infrared light irradiation. Within the prior art the use of metal-nitrides as single photoelectrodes for solar-driven water splitting has been reported. Here, the inventors present novel dual-photoelectrode devices consisting of an n-GaN nanowire photoanode and a p-InGaN nanowire photocathode, which are directly grown on low cost, large area Si substrates. Under parallel illumination, these devices exhibit an open circuit potential of 1.3 V and more than twenty-fold enhancement in the power conversion efficiency, compared to the individual photoelectrodes. The inventors have further demonstrated as described in Section B.XX novel dual-photoelectrode system consisting of GaN/InGaN nanowire photoanodes and a Si/InGaN photocathode, which can perform unassisted, direct solar-to-hydrogen conversion. Under parallel light illumination by splitting the sunlight spatially and spectrally, a power conversion efficiency of 2% is reported across the entire solar spectrum, which is more than one order of magnitude higher than the individual photoelectrodes.

A schematic of the side-by-side dual-photoelectrode design is depicted in FIG. 5A. The solar spectrum is split spatially and spectrally, and different light spectra are spread out to strike the corresponding single-band photoelectrodes on either side. Compared to conventional tandem configuration, the unique parallel illumination scheme offers several distinct advantages. First, it provides a better degree of flexibility in optimizing the photovoltage and photocurrent of a dual-photoelectrode device by splitting the sunlight spectrally and spatially in commensurate with the energy bandgap and light absorption capacity of the photoanodes and photocathodes. Second, the concept of parallel illumination can be extended to the design of parallel-connected multi-photoanodes (or photocathodes) with complementary bandgap. As the multi-photoanodes (or multi-photocathodes) are connected in parallel, current matching is not required such that the photocurrent generated by each photoanode (or photocathode) will add up to the total photocurrent of the photoanode (or photocathode). Moreover, the parallel-connected multi-photoanodes (or multi-photocathodes) possess an onset potential that can be as large as any of its single photoelectrode elements can provide. Such parallel-connected photoanodes (or photocathodes) offer both large photovoltage and high photocurrent and can break the Shockley-Quaisser limit of a single bandgap photoanode (or photocathode). Moreover, the surface area and light intensity of each electrode can be separately controlled, providing additional dimensions to optimize the current matching and open circuit potential and thereby leading to maximum efficiency.

To validate the design flexibility and efficiency enhancement, we have investigated two prototypes of devices consisting of In(Ga)N nanowire photocathodes and photoanodes with complementary bandgaps. The first design, schematically shown in FIG. 5B, is comprised of a GaN nanowire photoanode and an InGaN nanowire photocathode, which are designed to absorb the UV and visible spectrum of sunlight, respectively. The second structure incorporates a parallel-connected GaN nanowire and InGaN nanowire photoanode and a Si/InGaN photocathode, illustrated in FIG. 5C. The GaN nanowire photoanode, InGaN photoanode, and Si/InGaN photocathode are separately illuminated with wavelengths $\lambda<375$ nm, 375 nm$<\lambda<610$ nm, and $\lambda>610$ nm respectively, by splitting the solar spectrum.

B.2 Paired Nanowire Photoanode and Photocathode Device

B.2.1 Design and Fabrication

The design, fabrication and performance of paired GaN nanowire photoanode and InGaN nanowire photocathode device is first described. In this experiment, catalyst-free InGaN and GaN nanowires were grown. The vertically aligned InGaN or GaN nanowires were grown on a low resistivity (0.005 Ωcm) n-type Si(111) substrate by radio frequency plasma-assisted MBE under nitrogen-rich conditions without any foreign metal catalyst. Prior to loading into the MBE chamber, the Si(111) substrate was rinsed with acetone and methanol to remove any organic contaminants and was subsequently immersed in 10% hydrofluoric acid (HF) to remove native oxide. In situ oxide desorption was performed at ~770° C. before the growth initiation until the formation of a clean Si(111) 7×7 reconstructed surface pattern. To promote the nucleation of nanowires, an approximately single monolayer of Ga seeding was deposited. Thermal effusion cells were used as sources for Ga, In, Ge and Mg. Nitrogen ions were delivered from a radio frequency plasma source. The growth parameters included a nitrogen flow rate of 1.0 standard cubic centimeter per minute (sccm) and forward plasma power of ~350 W. The sample of InGaN nanowire photoanode and InGaN nanowire photocathode was doped n-type and p-typed using Ge and Mg, respectively. The growth temperature of the GaN nanowire photoanode, InGaN nanowire photoanode, and InGaN nanowire photocathode were ~750° C., ~570° C., and ~680° C., respectively.

Figure 6A:
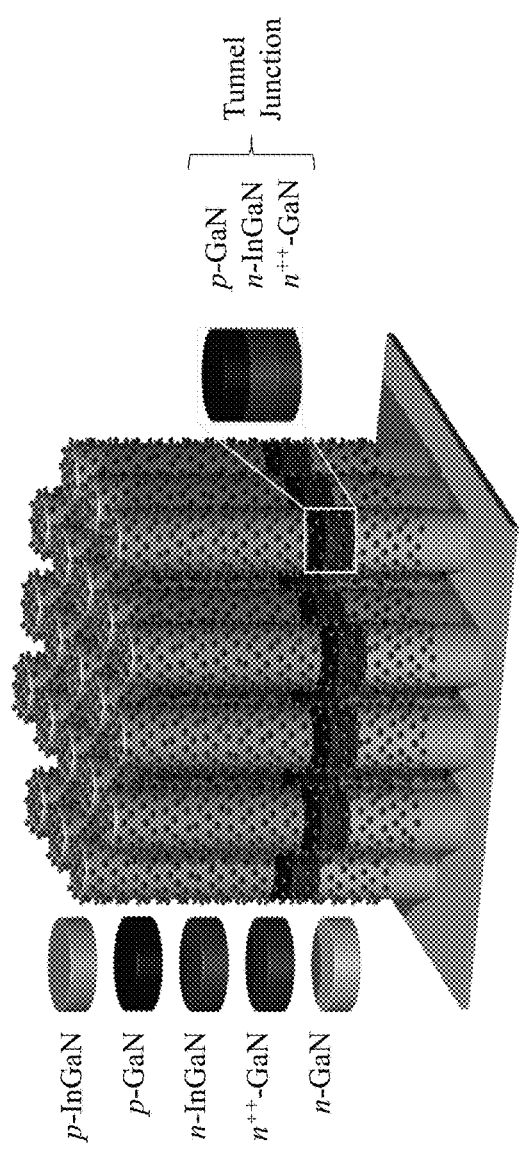
FIG. 6A depicts a schematic of a p-InGaN nanowire photocathode connected directly with a low resistivity n-Si substrate through a polarization-enhanced tunnel junction according to an embodiment of the invention wherein Pt nanoparticles of co-catalyst are also shown.
Figure 6C:
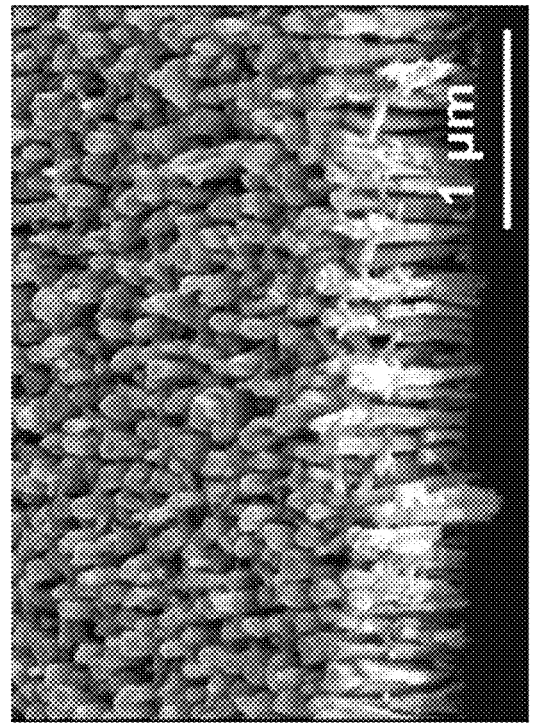
FIG. 6C depicts a 45° tilted SEM image of p-InGaN nanowires grown on n-Si substrate decorated with Pt nanoparticles according to an embodiment of the invention.
Figure 6B:
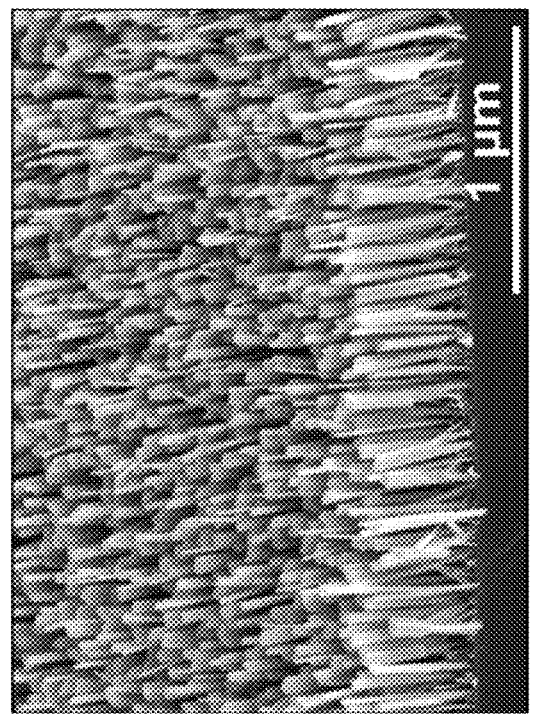
FIG. 6B depicts a 45° tilted SEM image of as-grown GaN nanowires on n-Si substrate according to an embodiment of the invention.

The InGaN nanowire photocathode consists of p-InGaN, a polarization enhanced tunnel junction, n-GaN, and n-type Si substrate, as shown in FIG. 6A. With the use of tunnel junction, p-InGaN nanowire photocathodes can be monolithically integrated on a low resistivity n-Si substrate. Detailed analysis of the tunnel junction was described elsewhere 39. Scanning electron microscopy (SEM) images of GaN and InGaN nanowires are shown in FIGS. 6B and 6C, respectively. The nanowires are vertically aligned on the Si substrate. The diameters are in the range of 40-50 nm, and the areal density is ~5×10$^9$ cm$^{-2}$. Pt co-catalysts were formed on p-InGaN nanowire surfaces by using a photodeposition method. In this process, Pt nanoparticles were preferentially reduced on the active sites of the nanowire surfaces by photogenerated electrons.

The deposition of Pt was carried out using photodeposition process. In this process, metal particles are preferentially reduced on the reactive sites on the surface of the photocatalyst (i.e. nanowires lateral surfaces) by the photogenerated electrons. First, the InGaN nanowire photocathode sample was placed in a Pyrex chamber. To deposit Pt particles, a 20 μL of 0.2M chloroplatinic acid hydrate was used as Pt precursor, and 12 mL of $CH_3OH$ (i.e. holes scavenger) and 60 mL water (~18MΩ) were poured into the Pyrex chamber with quartz window. The reaction chamber was irradiated using a 300 W xenon lamp for 30 minutes after evacuation.

Figure 6E:
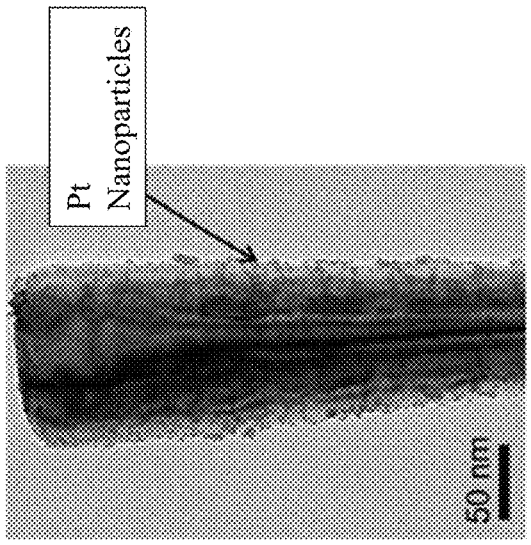
FIG. 6E depicts the uniform coverage of Pt nanoparticles on the lateral surfaces of a nanowire according to an embodiment of the invention.
Figure 6F:
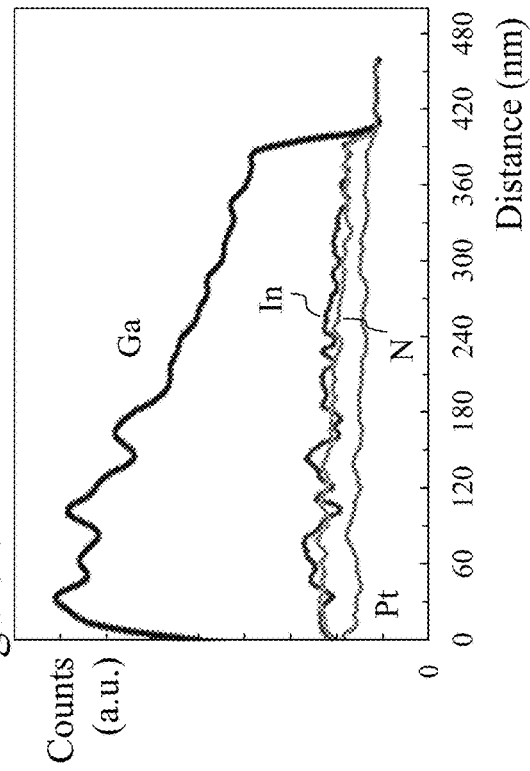
FIG. 6F depicts the variations of the In Lα, Ga Kα, and N Kα signals analyzed by EDXS along the nanowire axial direction as indicated by the arrow in FIG. 6D.
Figure 6D:
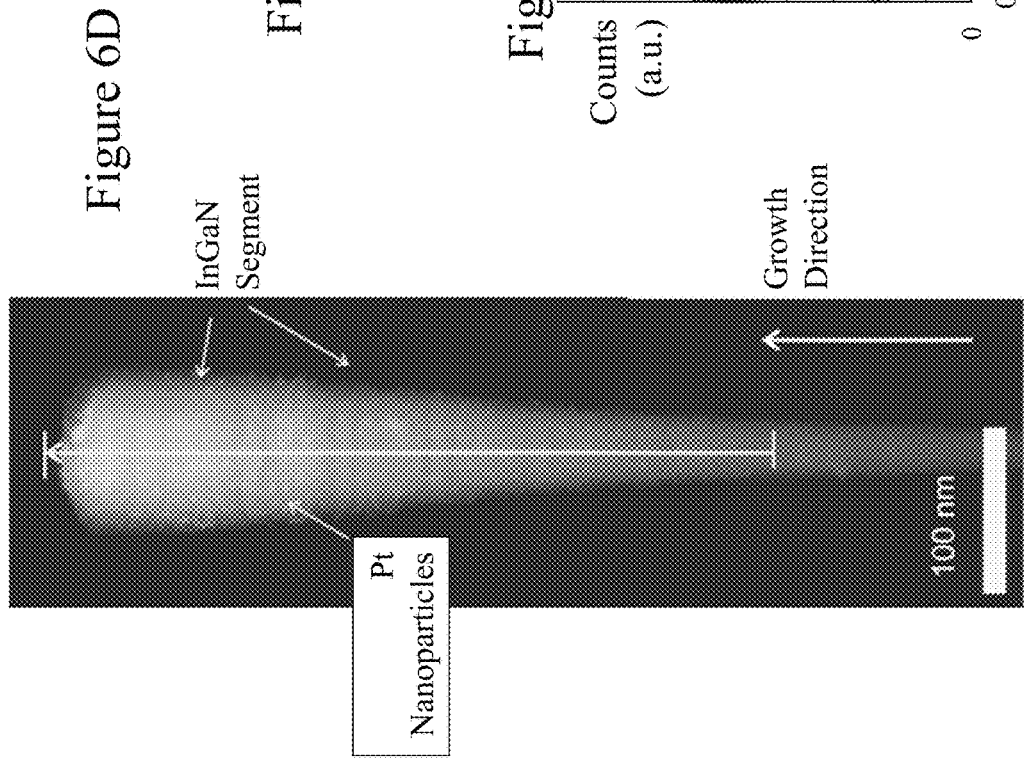
FIG. 6D depicts an STEM-HAADF image of a single p-InGaN nanowire according to an embodiment of the invention.

The structural properties of p-InGaN were analyzed by scanning transmission electron microscopy (STEM) using a Tecnai G2 F20 Cryo-STEM system operated at 200 kV and equipped with a Gatan 4 k×4 k charge coupled device (CCD) camera for the high-angle annular dark-field imaging (HAADF) images. SEM images were taken using an Inspect F-50 FE-SEM system. Accordingly, referring to FIG. 6D there is depicted an HAADF image of a p-InGaN nanowire decorated by Pt nanoparticles where the nanowire length is ~600 nm. The elemental distribution in the nanowire was analyzed by energy dispersive X-ray spectrometry (EDXS). Variations of the In Lα, Ga Kα, and N Kα signals along the nanowire axial direction (see arrow in FIG. 6D) are depicted in FIG. 6F. FIG. 6E depicts a TEM image showing uniformly distributed Pt nanoparticles along the lateral surfaces of the nanowire. The diameter of the Pt nanoparticles being ~1 nm.

Prior to performing photoelectrochemical (PEC) experiments, an Ohmic contact on the backside of the Si substrate was formed by applying Ga—In eutectic, which was connected to a Cu wire using silver paint. The sample backside was then covered by insulating epoxy.

B.2.2 Dual GaN Photoelectrode Performance

The photoelectrochemical (PEC) properties of the nanowire photoelectrodes were first investigated separately using a cell with a three-electrode configuration, consisting of an Ag/AgCl reference electrode, a Pt counter electrode, and a nanowire working electrode. The chamber was made of quartz in order to permit transmission of both UV and visible light from either a 300 W xenon lamp or an Oriel LCS-100 solar simulator used as an external light source. The light was passed through different filters, as specified in the specification. The illumination intensity was measured using a thermopile detector and an Interface100 electrochemical station employed throughout this study and the scan rate of the applied potential was 20 mV/s. The conversion from Ag/AgCl to reversible hydrogen electrode (RHE) is computed using Equation (1) where $E^0_{Ag/AgCl}$=0.197V and the pH value is close to zero. In the experiments performed the inventors employed HBr as the electrolyte, which can be equally useful compared to water splitting. Moreover, the presented photoelectrode design and concept can be readily applied to other systems for $H_2O$ reduction and oxidation.

$$E_{(RHE)} = E_{Ag/AgCl} + 0.059 \times pH + E^0_{Ag/AgCl} \quad (1)$$

A linear sweep voltammogram for the GaN nanowire photoanode was performed under both dark and illumination conditions as depicted in FIG. 7A. The onset potential of the photoanode is −0.3V (vs. RHE). Upon illumination the measured current density is saturated at 45 mA/cm² at 0V (vs. RHE). The decrease of the photocurrent when saturated can be attributed to several factors, including the change of the local concentration around the electrodes of the redox species due to the high current produced, heating effect, and the bubbles of the produced gases. The average incident-photon-to-current efficiency (IPCE) in the UV range is ~85%, which is higher than previously reported large bandgap materials. EOCP vs. RHE of GaN under dark and illumination conditions is shown FIG. 7B. Upon illumination the EOCP of GaN nanowire photoanode is ~−0.3V, which is consistent with the onset potential. The potential difference under illumination and dark of the GaN photoanode is ~0.6V, which is close to the band bending voltage, $V_{fb}$.

The J-E curve of p-InGaN nanowire photocathode was first measured using a full arc xenon lamp equipped with an AM1.5G filter as depicted in FIG. 7C. The onset potential is ~1V (vs. RHE), and the current density increases to ~95 mA/cm² at −0.4V (vs. RHE). The open-circuit potential difference under illumination and dark is ~0.3V, illustrated in FIG. 7B, which shows the behavior of p-type semiconductor. It is worth noting that the $E_{OCP}$ of the photocathode and photoanode extend beyond the redox potentials, which can minimize the need for external electric energy to achieve maximum efficiency for the dual-photoelectrode device described below.

Figure 8:
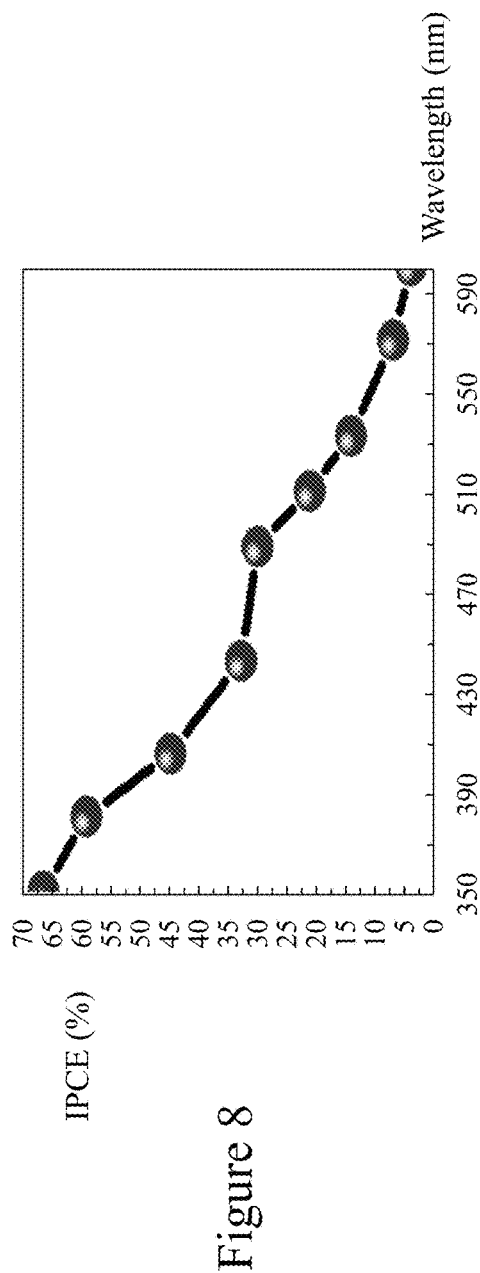
FIG. 8 depicts the incident-photon-to-current conversion efficiency (IPCE) of InGaN nanowire photocathodes according to an embodiment of the invention measured at an applied bias of −0.4V (vs. RHE) in 1 mol/L HBr.

The J-V curve and $E_{OCP}$ of the InGaN nanowire photocathode under visible light illumination (400 nm≤λ≤600 nm) was also studied. The IPCE values for the InGaN nanowire photocathode were derived by measuring the current under 300 W xenon lamp irradiation with several optical band pass filters. Throughout the measurements, the scan rate of the applied potential was 20 mV/s. The photocurrent was obtained by subtracting the dark current density from the measured current density for a given wavelength. Various band pass filters, with center wavelengths at $\lambda_C$=350, 380, 408, 445, 488, 510, 532, 570, 600 nm were used. The light intensity after the filters was measured using a power meter equipped with a UV-vis enhanced Si photodiode detector. The IPCE was then computed using Equation (2) and are plotted in FIG. 8 at −0.4V vs. RHE. The maximum IPCE is ~65% at 350 nm. The IPCE drops to 45% at the wavelength of 400 nm and further decreases towards longer wavelengths (>600 nm), which outperforms some previously reported photocathode materials.

$$IPCE(\%) = \frac{1240(V \times nm) \times PhotocurrentDensity(mA/cm^2)}{IncidentWavelength(nm) \times Intensity(mW/cm^2)} \times 100 \quad (2)$$

Figure 10:
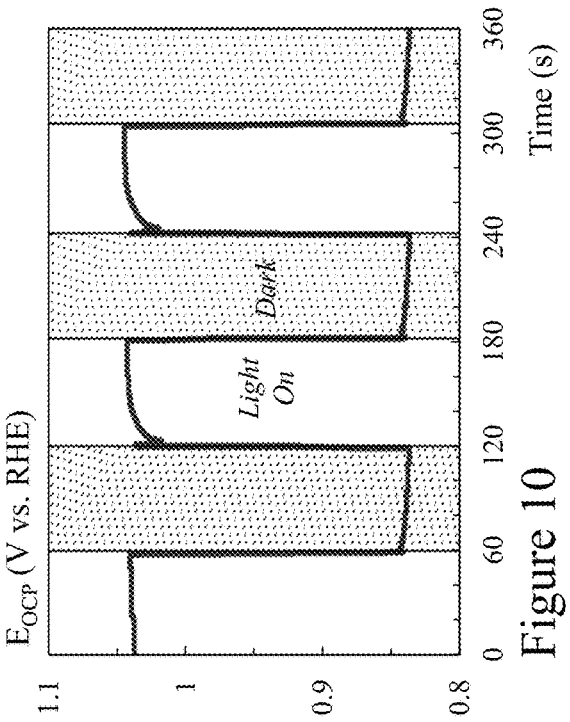
FIG. 10 depicts the open circuit potential of the p-InGaN nanowire photocathode according to an embodiment of the invention under 400 nm≤λ≤600 nm illumination and dark conditions.
Figure 9:
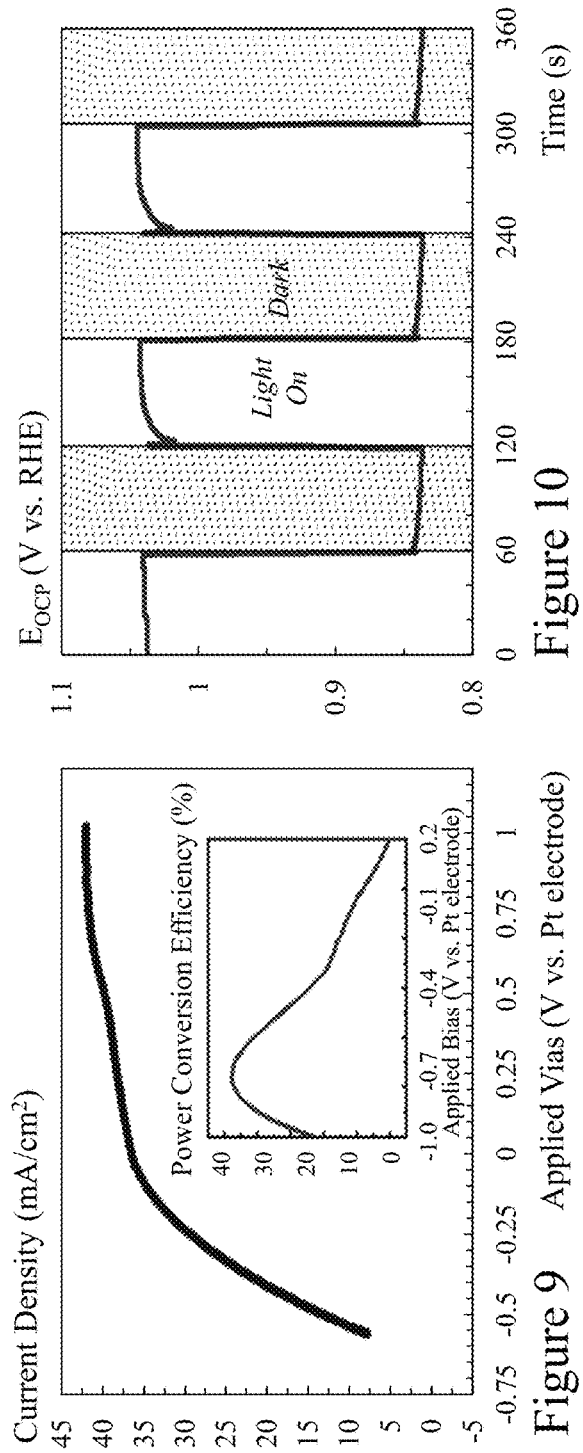
FIG. 9 depicts variations of the current density for the InGaN nanowire photocathode according to an embodiment of the invention as a function of applied bias versus Pt electrode in 1 mol/L HBr under illumination of 400 nm≤λ≤600 nm 400-600 nm, whilst the insert depicts the calculated power conversion efficiency of the InGaN nanowire photocathode as a function of the applied bias (vs. Pt electrode)

The J-V curve of the InGaN nanowire photocathode under illumination of 400 nm≤λ≤600 nm is shown in FIG. 9. The calculated power conversion efficiency of the stand-alone photocathode is shown in the inset of the FIG. 9. The power conversion efficiency was calculated using the J-V curve under 400 nm≤λ≤600 nm as presented in FIG. 9. The maximum power conversion efficiency of the InGaN nanowire photocathode is ~0.46% at −0.8V (vs. Pt electrode). Referring to FIG. 10 the open circuit potential of the p-InGaN nanowire photocathode under illumination of 400 nm≤λ≤600 nm. Under illumination, the open circuit potential is ~1.04V vs. RHE.

Figure 11A:
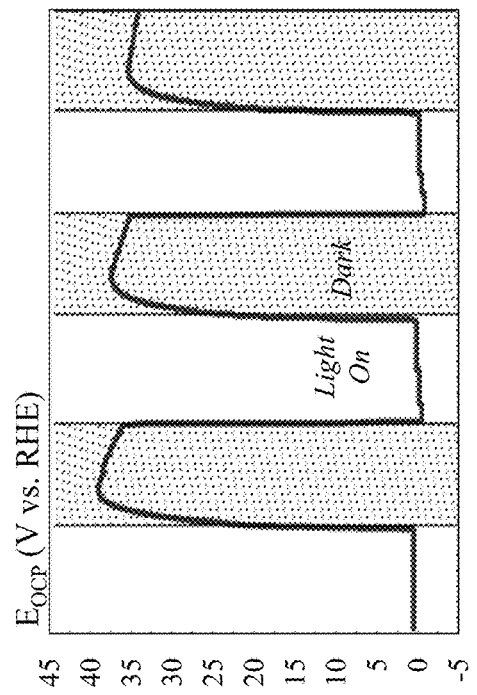
FIG. 11A depicts an I-V curve of the paired GaN nanowire photoanode and InGaN nanowire photocathode according to an embodiment of the invention under dark and illumination conditions with wavelengths of 300-400 nm and 400-600 nm respectively and power densities of ~120 mW/cm² and ~160 mW/cm² respectively whilst the power conversion efficiency of the dual photoelectrode device versus applied bias is shown in the inset.
Figure 11B:
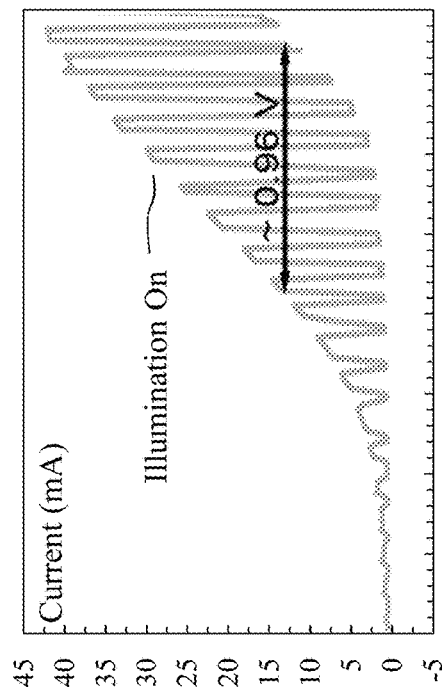
FIG. 11B depicts the open-circuit potential ($E_{OCP}$) of the dual-photoelectrode.

Subsequently, the n-GaN photoanode and p-InGaN photocathode were connected to form a dual-photoelectrode device, as schematically depicted in FIG. 5B. The GaN photoanode and the InGaN photocathode were separately illuminated with wavelengths of 300 nm≤λ≤400 nm and 400 nm≤λ≤600 nm and power densities of ~120 mW/cm² and ~160 mW/cm², respectively. The sample areas of both photoelectrodes are ~1 cm². A linear sweep voltammogram of the dual-photoelectrode is shown in FIG. 11A. The short-circuit current of the dual-photoelectrode is ~20 mA/cm², and the current density is saturated at ~43 mA/cm² above 0.7V (vs. the photocathode). The onset potential occurred at −1.2V (vs. the photocathode), which is consistent with the open circuit measurement shown in FIG. 11B. The near 1V onset potential shift compared to the GaN photoanode vs. Pt counter electrode (inset of FIG. 7A) is due to the synergetic effect of the dual-photoelectrode. Shown in FIG. 11B, the open circuit potential of the dual-photoelectrode is ~−1.3V vs. the photocathode under illumination, which is interpreted as the difference of the Fermi levels of the photoanode and the photocathode. The open circuit potential is consistent with the onset potential shown in FIG. 11A. Under dark conditions, the open circuit potential is −0.2V vs. the photocathode.

Figure 11C:
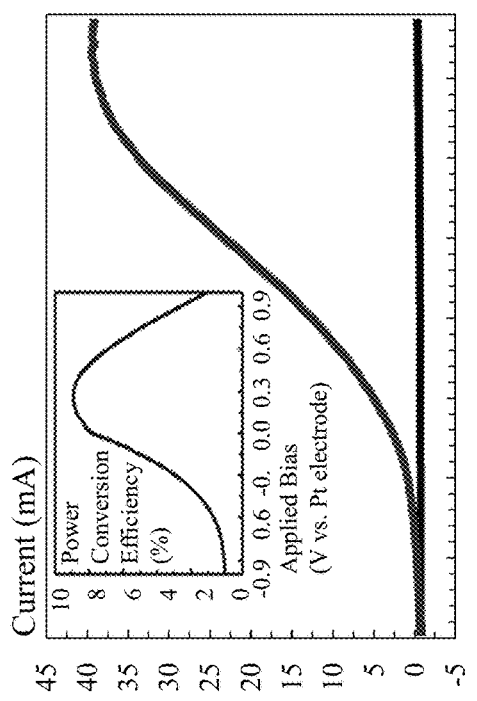
FIG. 11C depicts the I-V curve of dual-photoelectrode devices according to an embodiment of the invention with the photocathode and photoanode under continuous and chopped illumination, respectively, wherein under no illumination on the photoanode the current density approaches zero, due to the current matching requirement.
Figure 11D:
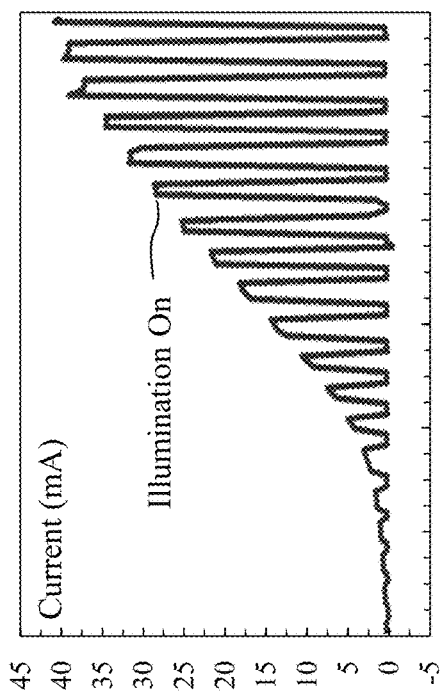
FIG. 11D depicts the I-V curve of the dual-photoelectrode devices according to an embodiment of the invention with the photoanode under continuous illumination and the photocathode under chopped illumination wherein the measured photocurrent is nonzero even when there is no illumination on the photocathode as the Pt-decorated nanowires on the photocathode can act as a catalyst for hydrogen evolution reaction.

To further study the effect of the dual-photoelectrode, linear sweep voltammogram measurements were performed with the light source chopped on either the photoanode or the photocathode. Shown in FIG. 11C, when the illumination on the photoanode was blocked, no photocurrent could be measured, which is limited by the current matching requirement. However, when the illumination on the photocathode was blocked, pronounced photocurrent could still be measured, shown in FIG. 11D. The I-V shows ~1V shift, compared to that when both photoelectrodes were illuminated. This interesting phenomena is explained by that photogenerated electrons from the photoanode can be injected into the photocathode and drive hydrogen evolution reaction (HER) through the Pt-decorated nanowire segment. The power conversion efficiency of the dual-photoelectrode device was derived using Equation (3) where I is the photocurrent, $E_{rev}^0$ is the standard state-reversible potential (i.e. 1.07V for Br⁻), $V_{app}$ is the actual applied bias between the working electrode and the counter electrode, and $P_{in}$ is the power of the incident light.

$$\eta(\%) = \frac{I(E_{rev}^0 - V_{app})}{P_{in}} \times 100\% \quad (3)$$

Variations of the power conversion efficiency vs. applied bias is shown in the inset of FIG. 11A. A maximum power conversion efficiency of ~9% was measured at 0.3V (vs. the photocathode). For comparison, the power conversion efficiency of the stand-alone InGaN photocathode is only 0.5% under visible light illumination (400 nm≤λ≤600 nm). The nearly twenty-fold enhancement in the power conversion efficiency clearly demonstrates the distinct advantages of a dual-photoelectrode device under parallel illumination.

B.2.3. Dual GaN Photoanode with Si/InGaN Photocathode

For practical applications, the bandgaps of the two photoelectrodes should be approximately 1.7 and 1.0 eV in order to optimize solar absorption. In this regard, the inventors have investigated the second prototype device, consisting of GaN and InGaN nanowire photoanodes, which are connected in parallel, and a Si/InGaN nanowire photocathode, schematically shown in FIG. 5B.

B.2.3.1. Fabrication and Characterization Si/InGaN Nanowire Photocathode

The Si/InGaN nanowire photocathode consists of p-InGaN/tunnel junction/n-GaN nanowire arrays grown directly on a Si solar cell. The fabrication of n⁺-p Si solar cell wafers exploits p-doped Si(100) wafers with a thickness of 256-306 μm. The solar cell wafers were fabricated using a thermal diffusion process. The front and back side of the wafers were first covered with phosphorus and boron dopants by spin coating, respectively. The samples were then baked at 950° C. for 20 minutes under a $N_2$ flow rate of 200 standard cubic center meter per minute (sccm) in a diffusion furnace. The n+ emitter layer and a p+ electron back reflection layer were formed during the thermal diffusion process. MBE growth of InGaN nanowire arrays followed these processes. A schematic of the Si/InGaN nanowire photocathode design is depicted in FIG. 1A.

Now referring to FIG. 12 there is depicted an SEM image of InGaN nanowire arrays grown on n-type Si(111) substrate wherein the nanowires are nearly vertically aligned to the substrate. The wire lengths and diameters are in the ranges of 400-500 nm and 80-140 nm, respectively. The nanowires are doped n-type using Ge to enhance the current conduction. Optical properties of the InGaN nanowire photoanode were studied by photoluminescence spectroscopy. As depicted in FIG. 13, the emission peak is at ~643 nm.

The I-V characteristics of the InGaN nanowire photoanode vs. Pt wire in 1 mol/L HBr under simulated sunlight illumination is shown in FIG. 14, wherein the onset potential is ~0.65V. Thus, the maximum ABPE of stand-alone GaN nanowire photoanode is ~0.15% at 0.9 eV (vs. Pt electrode).

The bandgaps of InGaN nanowire photoanode and Si are ~2.0 eV and ~1.1 eV, respectively. The Si/InGaN nanowire photocathode consists of p-InGaN/tunnel junction/n-GaN nanowire arrays grown directly on a Si solar cell. Such a photocathode can effectively absorb near-infrared light irradiation and provide relatively high onset potential.

PEC experiments were performed separately on the GaN nanowire photoanode, InGaN nanowire photoanode, and Si/InGaN photocathode under AM1.5G 1 sun illumination using a solar simulator. The PV-InGaN-nanowire-cathode was decorated with Pt nanoparticles. FIG. 15A depicts the J-E characteristics of the GaN and InGaN nanowire photoanodes whose onset potentials are −0.3V and 0.6V (vs. RHE), respectively. The saturation current of the GaN nanowire photoanode is ~1 mA/cm², whereas the photocurrent density of the InGaN-nanowire-anode reaches ~4.7 mA/cm² at 1.2V (vs. RHE). This current density of the InGaN nanowire photoanode corresponds to an average IPCE of ~40% in the wavelength range 300 nm≤λ≤610 nm. The J-E curve of the InGaN nanowire photoanode under 375 nm≤λ≤610 nm illumination is also shown in FIG. 15B, which confirms that most of the photocurrent is due to the visible light illumination. The onset potential of the photocathode is ~0.5V (vs. RHE) while the saturation current is ~19 mA/cm² under AM1.5G 1 sun illumination. The onset potential remained the same and the saturation photocurrent was reduced to ~14 mA/cm² under λ≥610 nm illumination.

The GaN and InGaN nanowire photoanodes were subsequently paired with the Si/InGaN photocathode, schematically shown in FIG. 5C. The sample areas of the GaN and InGaN nanowire photoanodes and Si/InGaN nanowire photocathode were 1 cm², 1 cm², and 0.45 cm², which were illuminated with light in the wavelength ranges of λ≤375 nm, 375 nm≤λ≤610 nm, and λ≥610 nm, respectively. The combination of these illuminations resembles the full spectrum of AM1.5G. Now referring to FIG. 15B the I-V curve follows that of the parallel-connected GaN and InGaN nanowire photoanodes, due to the current matching requirement. The onset potential is −0.6V vs. the photocathode. At zero bias (0V vs. the photocathode), the photocurrent of the device is ~0.9 mA, which leads to a power conversion efficiency of 1.5%. The applied bias photon-to-current efficiency (ABPE) is further calculated using Equation (3) and is plotted in FIG. 15C. A maximum ABPE of ~2% was measured at ~0.6V vs. the photocathode, which is nearly 14-fold higher than the ABPE (~0.15%) of the stand-alone InGaN nanowire photoanode under simulated sunlight illumination. The efficiency can be further improved by increasing the photocurrent of the photoanode with enhanced indium incorporation and by optimizing the onset potentials of the photoanodes and photocathodes.

It would be evident to one of skill in the art that the above discussions of embodiments of the invention with respect to FIGS. 1 to 15C have focused primarily on the nanowire based photoanode and photocathode structures. However, it is understood that the semiconductor nanowire based photoanode(s) and photocathode(s) are employed in conjunction with an overall assembly comprising optical and mechanical sub-assemblies in order to provide the required mechanical integrity, fluidic sealing, fluidic flow, gas recovery, etc. as well as coupling of the optical source, e.g. the sunlight, to the semiconductor nanowire based photoanode(s) and photocathode(s).

Whilst within an embodiment of the invention the semiconductor nanowire based photoanode(s) and photocathode(s) may be implemented sequentially upon a substrate such that the semiconductor nanowire based photoanode(s) and photocathode(s) are distributed across the same regions it is anticipated that a more common arrangement would be discrete "tiled" regions of semiconductor nanowire based photoanode(s) and photocathode(s) spatially distributed. Whilst the distribution of the semiconductor nanowire based photoanode(s) and photocathode(s) within the same region removes the requirement for an intermediate optical sub-assembly to spectrally and spatially separate the incident sunlight the efficiency is expected to be reduced in proportion to the number of semiconductor nanowire based photoanode(s) and photocathode(s) employed. For example, a single photoanode and single photocathode geometry would imply that per square unit area with 50:50 distribution then 50% of the incident sunlight within the wavelength range of the photoanode is not absorbed as it impinges the wrong nanowires.

Accordingly, an optical sub-assembly spatially and spectrally coupling to "tiles" of single photoanode/photocathode design implies increased coupling. However, designing an optical sub-assembly that splits the received optical signal into two or more spectral portions and then couples these to "tiled" semiconductor nanowire based photoanode(s) and photocathode(s) with low cost, low loss and low mechanical complexity with high (>90%) footprint utilization may be difficult. Accordingly, whilst the efficiency of absorption per unit area of the semiconductor nanowire based photoanode(s) and photocathode(s) may be increased their utilization of available sunlight may not be as efficient in a planar configuration. Accordingly, it is anticipated that a range of mechanical-optical assemblies may exploit discrete semiconductor nanowire based photoanode(s) and photocathode(s) whilst a different range of mechanical-optical assemblies would exploit monolithic integrated photoanode(s) and photocathode(s) or monolithically integrated multiple photoanode(s) or photocathode(s).

Accordingly, the inventors have demonstrated that shown that a dual-photoelectrode device, in conjunction with a parallel illumination scheme and the extreme flexibility in bandgap engineering of metal-nitride nanowire structures, can enhance the power conversion efficiency by more than one order of magnitude, compared to that of the individual photoelectrodes. In this configuration, the large bandgap photoelectrode provides high open circuit potential, while photocurrent matching can be readily achieved by splitting the solar spectrum in commensurate with bandgap engineering. Moreover, both the photovoltage and photocurrent can be optimized by connecting multi-photoanodes (or photocathodes) in parallel. The significantly enhanced power conversion efficiency is unprecedented for a dual-photoelectrode device and clearly illustrates the extraordinary potential of metal-nitride nanowire photoelectrodes, in conjunction with the parallel illumination scheme, for achieving high efficiency, unassisted solar-to-hydrogen conversion.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
a photoanode absorbing photons within a first predetermined wavelength range;
a photocathode absorbing photons within a second predetermined wavelength range; and
an optical assembly disposed between an external source of incident illumination and the photoanode and photocathode to filter the incident illumination such that incident illumination within the first predetermined wavelength range is coupled to the photoanode and incident illumination within the second predetermined wavelength range is coupled to the photocathode.

2. The device according to claim 1, further comprising
a second photoanode for absorbing photons within a third predetermined wavelength range; disposed in parallel electrically with the photoanode, wherein
the optical assembly couples incident illumination within the third predetermined wavelength range to the second photoanode.

3. The device according to claim 1, wherein
the photoanode comprises a plurality of photoanodes disposed in parallel, each photoanode operative upon a predetermined portion of the first predetermined wavelength range;
the optical assembly filters the incident illumination such that incident illumination within each predetermined portion of the first predetermined wavelength range is coupled to the respective photoanode of the plurality of photoanodes; and
the physical position of each photoanode of the plurality of photoanodes is determined by the optical assembly design.

4. The device according to claim 1, wherein
the photocathode comprises a plurality of photocathodes disposed in parallel, each photocathode operative upon a predetermined portion of the second predetermined wavelength range;
the optical assembly filters the incident illumination such that incident illumination within each predetermined portion of the second predetermined wavelength range is coupled to the respective photocathode of the plurality of photocathodes; and
the physical position of each photocathode of the plurality of photocathodes is determined by the optical assembly design.

5. The device according to claim 1, wherein
the photoanode comprises a plurality of GaN based nanowires; and
the photocathode comprises a plurality of InGaN based nanowires.

6. The device according to claim 1, wherein
a first predetermined portion of the photoanode comprises a plurality of GaN based nanowires;
a second predetermined portion of the photoanode comprises a plurality of InGaN based nanowires; and
the photocathode comprises a plurality of Si/InGaN based nanowires.

* * * * *